(12) United States Patent
Hasabnis et al.

(10) Patent No.: US 10,120,663 B2
(45) Date of Patent: Nov. 6, 2018

(54) INTER-ARCHITECTURE COMPATABILITY MODULE TO ALLOW CODE MODULE OF ONE ARCHITECTURE TO USE LIBRARY MODULE OF ANOTHER ARCHITECTURE

(71) Applicant: Intel Corporation, Santa Clara, CA (US)

(72) Inventors: Niranjan Hasabnis, Centereach, NY (US); Suresh Srinivas, Portland, OR (US); Jayaram Bobba, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,795

(22) Filed: Mar. 28, 2014

(65) Prior Publication Data

US 2015/0277867 A1 Oct. 1, 2015

(51) Int. Cl.
*G06F 9/44* (2018.01)
*G06F 9/45* (2006.01)
(Continued)

(52) U.S. Cl.
CPC .......... *G06F 8/433* (2013.01); *G06F 9/44521* (2013.01); *G06F 9/4552* (2013.01)

(58) Field of Classification Search
CPC ........ G06F 8/51; G06F 9/45516; G06F 8/433; G06F 9/44521; G06F 8/443; G06F 9/45521; G06F 9/4552; G06F 9/45558
See application file for complete search history.

(56) References Cited

U.S. PATENT DOCUMENTS 5,379,432 A * 1/1995 Orton ........................ G06F 8/70
719/315
5,473,777 A * 12/1995 Moeller ................ G06F 9/4488
719/328
(Continued)

FOREIGN PATENT DOCUMENTS

EP 1 457 881 A1 9/2004
JP 4-309135 A 10/1992
(Continued)

OTHER PUBLICATIONS https://software.intel.com/sites/default/files/article/402129/mpx-linux64-abi.pdf, 2013, pp. 89-136.*
(Continued)

*Primary Examiner* — Mongbao Nguyen
(74) *Attorney, Agent, or Firm* — NDWE, LLP

(57) ABSTRACT

An inter-architecture compatibility apparatus of an aspect includes a control flow transfer reception module to receive a first call procedure operation, intended for a first architecture library module, from a first architecture code module. The first call procedure operation involves a first plurality of input parameters. An application binary interface (ABI) change module is coupled with the control flow transfer reception module. The ABI change module makes ABI changes to convert the first call procedure operation involving the first plurality of input parameters to a corresponding second call procedure operation involving a second plurality of input parameters. The second call procedure operation is compatible with a second architecture library module. A control flow transfer output module is coupled with the ABI change module. The control flow transfer output module provides the second call procedure operation to the second architecture library module.

20 Claims, 14 Drawing Sheets

(51) Int. Cl.
  *G06F 8/41* (2018.01)
  *G06F 9/445* (2018.01)
  *G06F 9/455* (2018.01)

(56) References Cited

U.S. PATENT DOCUMENTS

| | | | |
|---|---|---|---|
| 5,604,885 | A | 2/1997 | Denio |
| 5,870,587 | A | 2/1999 | Danforth et al. |
| 6,438,621 | B1 | 8/2002 | Kanamori et al. |
| 6,715,063 | B1 | 3/2004 | McGrath |
| 6,725,366 | B1* | 4/2004 | Swanberg ............... G06F 9/322 711/220 |
| 6,928,643 | B2* | 8/2005 | McGoogan ......... G06F 9/44521 717/151 |
| 7,073,167 | B2* | 7/2006 | Iwashita .................. G06F 8/41 717/140 |
| 7,124,445 | B2* | 10/2006 | Cronce ................... G06F 21/14 726/26 |
| 7,406,681 | B1* | 7/2008 | Hinker .................... G06F 8/51 717/106 |
| 8,832,679 | B2* | 9/2014 | Suchy ..................... G06F 8/64 717/100 |
| 9,075,636 | B2* | 7/2015 | Gschwind ............. G06F 9/4425 |
| 9,189,620 | B2* | 11/2015 | Dewan ................... G06F 21/53 |
| 9,891,939 | B2* | 2/2018 | Hunt .................... G06F 9/45558 |
| 2004/0006762 | A1 | 1/2004 | Stewart |
| 2004/0015889 | A1* | 1/2004 | Todd ........................ G06F 8/51 717/137 |
| 2005/0086650 | A1* | 4/2005 | Yates, Jr. ............ G06F 9/45533 717/139 |
| 2005/0181184 | A1 | 8/2005 | Obermann |
| 2006/0184919 | A1* | 8/2006 | Chen ................... G06F 9/45516 717/127 |
| 2008/0216073 | A1 | 9/2008 | Yates et al. |
| 2009/0055836 | A1* | 2/2009 | Supalov ................... G06F 9/541 719/313 |
| 2009/0100416 | A1 | 4/2009 | Brown et al. |
| 2009/0144046 | A1 | 6/2009 | Rothman et al. |
| 2009/0164768 | A1* | 6/2009 | Nishida ................. G06F 9/4401 713/1 |
| 2010/0077378 | A1* | 3/2010 | Maguire ................. G06F 9/455 717/106 |
| 2011/0029961 | A1* | 2/2011 | Muth ....................... G06F 21/52 717/154 |
| 2011/0209133 | A1* | 8/2011 | Mahajan .................. G06F 8/43 717/170 |
| 2012/0222024 | A1* | 8/2012 | Das ..................... G06F 9/44521 717/170 |
| 2012/0227061 | A1 | 9/2012 | Hunt et al. |
| 2012/0284792 | A1* | 11/2012 | Liem ...................... G06F 21/52 726/22 |
| 2013/0185699 | A1 | 7/2013 | Oguma et al. |
| 2014/0007044 | A1* | 1/2014 | Aliseychik ............... G06F 8/30 717/106 |
| 2014/0040921 | A1* | 2/2014 | Li ........................... G06F 9/54 719/320 |
| 2014/0046649 | A1 | 2/2014 | Wu et al. |
| 2014/0195783 | A1* | 7/2014 | Karthikeyan ....... G06F 9/30036 712/222 |
| 2014/0282371 | A1* | 9/2014 | Hirsch ..................... G06F 8/65 717/106 |
| 2014/0337825 | A1* | 11/2014 | Challa ...................... G06F 8/65 717/168 |
| 2015/0040216 | A1* | 2/2015 | Moore .................... G06F 21/52 726/22 |

FOREIGN PATENT DOCUMENTS

| | | |
|---|---|---|
| JP | 2014-510343 A | 4/2014 |
| KR | 10-2001-0086328 A | 9/2001 |
| KR | 10-2012-0063960 A | 6/2012 |
| TW | 367445 B | 8/1999 |
| TW | I279686 B | 4/2007 |
| TW | I280765 B | 5/2007 |
| TW | 200941339 A1 | 10/2009 |
| WO | 2014/172710 A1 | 10/2014 |

OTHER PUBLICATIONS https://www.cilkplus.org/sites/default/files/open_specifications/Intel-ABI-Vector-Function-2012-v0.9.5.pdf, 2013, pp. 1-14.*
Sun microsystems, Solaris 64-bit Developer's Guide, 2000, pp. 9-11 and 33-47. https://docs.oracle.com/cd/E19455-01/806-0477/806-0477.pdf (Year: 2000).*
Dell, Migrating to 64-bit Industry-Standard Architecture, 2004, pp. 1-9 http://www.dell.com/downloads/global/products/pedge/en/64bit_wpapr.pdf (Year: 2004).*
Arnaud Grasset, Automatic Generation of Component Wrappers by Composition of Hardware Library Elements Starting from Communication Service Specification, 2005, pp. 1-7. https://ieeexplore.ieee.org/stamp/stamp.jsp?tp=&arnunnber=1509432 (Year: 2005).*
Tobias Beisel, Using Shared Library Interposing for Transparent Application Acceleration in Systems with Heterogeneous Hardware Accelerators, 2010, pp. 1-8. https://ieeexplore.ieee.org/stannp/stannp.jsp?tp=&arnunnber=5540798 (Year: 2010).*
"iPhone 5S", From Wikipedia, the free encyclopedia, pp. 1-15, Date Mar. 28, 2014, http://en.wikipedia.org/wiki/IPhone_5S.
"WOW64 Implementation Details", WOW64 Implementation Details (Windows), 2 pages, Date Mar. 28, 2014, http://msdn.microsoft.com/en-us/library/windows/desktop/aa384274(v=vs.85).aspx.
"WoW64 ", From Wikipedia the free encyclopedia, pp. 1-3, Date Mar. 28, 2014, http://en.wikipedia.org/wiki/WoW64.
Office Action received for Korean Patent Application No. 10-2015-0027602, dated Nov. 20, 2015, 7 pages of English Translation and 6 pages of Korean Office Action.
Combined Search and Examination Report received for United Kingdom Patent Application No. 1500818.8, dated Jul. 16, 2015, 9 pages.
Examination Report received for United Kingdom Patent Application No. 1500818.8, dated Feb. 7, 2017, 3 pages.
Notice of Allowance received for Japanese Patent Application No. 2015-005697, dated Mar. 7, 2017, 2 pages of Japanese Notice of Allowance Only.
Office Action received for Korean Patent Application No. 10-2015-0027602, dated Jun. 30, 2017, 8 pages of Korean Office Action including 4 pages of English Translation.
Office Action received for Chinese Patent Application No. 201510091576.8, dated Aug. 10, 2017, 22 pages of Chinese Office Action including 12 pages of English Translation.
Examination Report received for United Kingdom Patent Application No. 1500818.8, dated Jun. 5, 2017, 3 pages.
Office Action received for Korean Patent Application No. 10-2015-0027602, dated Nov. 30, 2016, 3 pages of Korean Office Action Only.
Notice of Allowance and Search Report received for Taiwan Patent Application No. 104105063, dated Oct. 28, 2016, 4 pages of Taiwan Notice of Allowance including 1 page of English Translation of Search Report.
Office Action received for Japan Patent Application No. 2015-005697, dated Oct. 25, 2016, 2 pages of Japan Office Action including 1 page of English Translation.
Office Action received for Japanese Patent Application No. 2015-005697, dated Feb. 23, 2016, 4 pages of Japanese Office Action including 2 pages of English Translation.
Naoki Sato, "How the x64 Windows Work and The Essence for Developing 64 Bit Applications", C Magazine, Softbank Publishing Co. Ltd., vol. 17, Sep. 2005, 24 Pages.

* cited by examiner

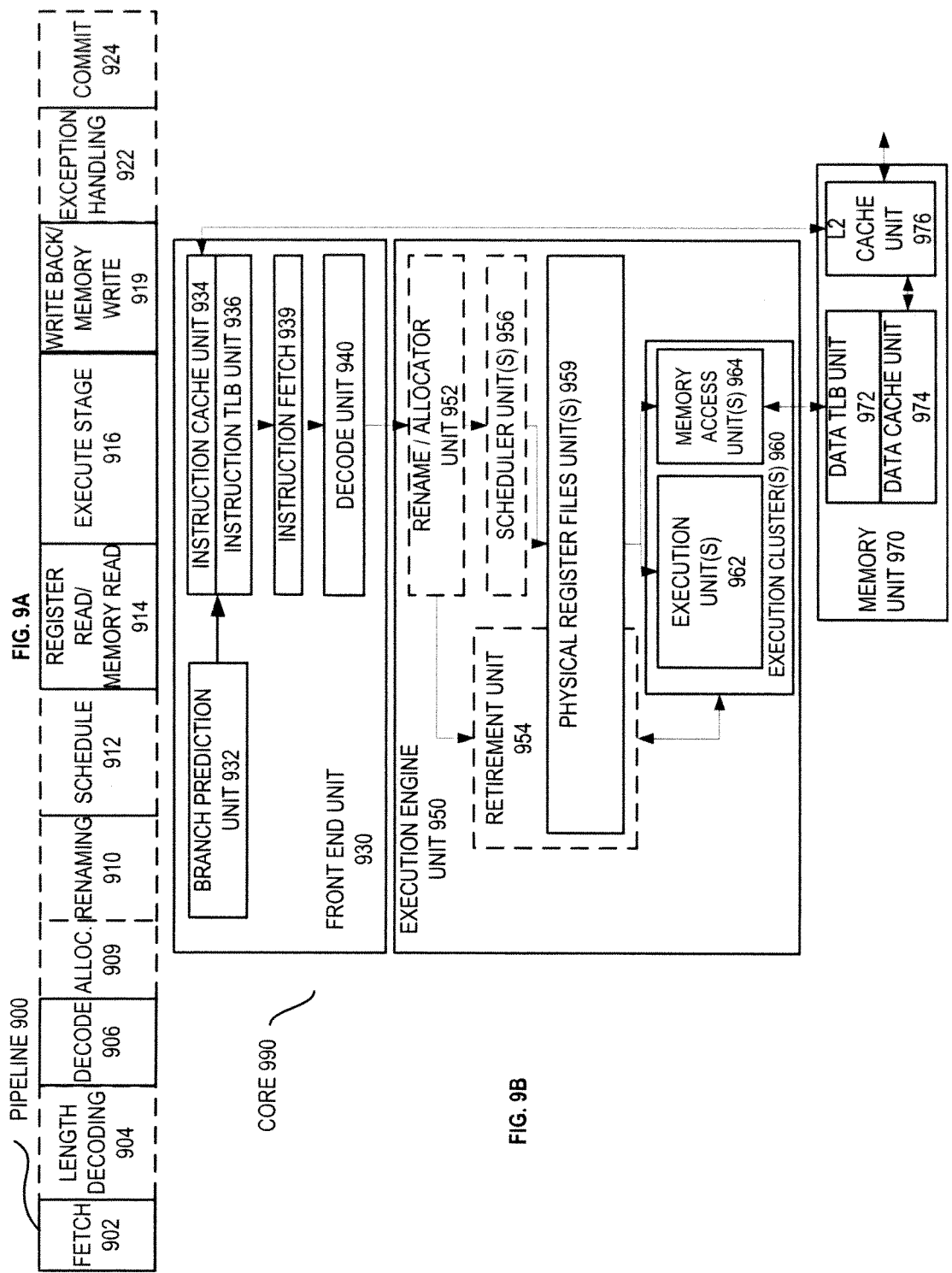

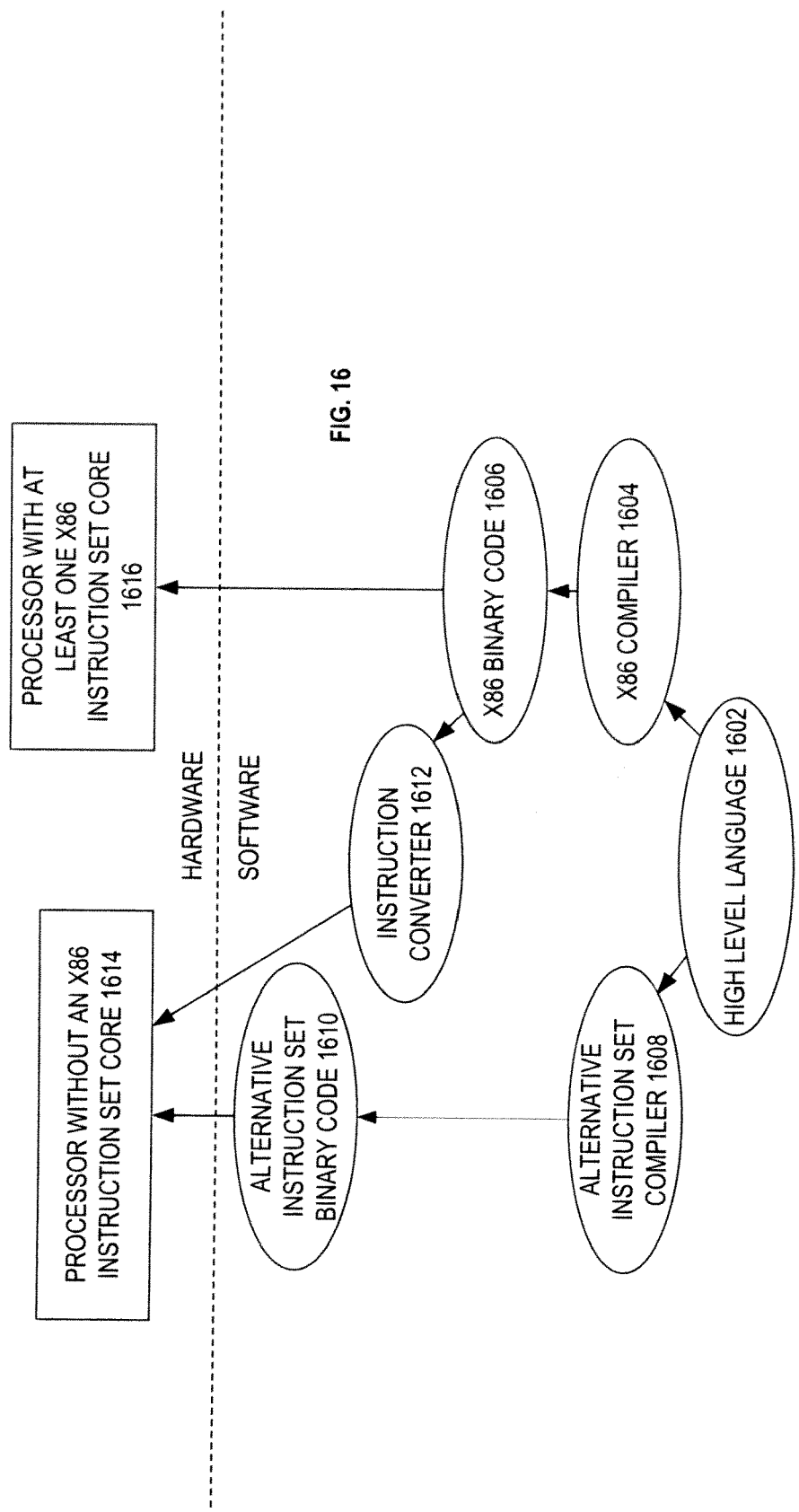

INTER-ARCHITECTURE COMPATABILITY MODULE TO ALLOW CODE MODULE OF ONE ARCHITECTURE TO USE LIBRARY MODULE OF ANOTHER ARCHITECTURE

BACKGROUND

Technical Field

Embodiments described herein generally relate to execution of code on electronic devices. In particular, embodiments described herein generally relate to execution of code of different architectures on electronic devices.

Background Information

Until recently most smartphones, cellular phones, tablet computers, and the like, have been based on 32-bit architectures. They have had 32-bit architecture processors and 32-bit operating systems. A wide variety of 32-bit code has been written for these 32-bit architectures. For example, numerous mobile applications have been written for these devices. Also, 32-bit libraries have been written for these 32-bit architectures.

Recently, smartphones with 64-bit architectures have become available. These 64-bit architectures are based on 64-bit architecture processors and 64-bit operating systems. For example, the iPhone 5S has recently become available from Apple Corporation. The iPhone 5S includes an A7 processor chip with a 64-bit architecture and a 64-bit operating system known as iOS 7. Other 64-bit architecture smartphones have also been announced and/or are in development.

At least during the initial stages of deployment of these 64-bit architecture smartphones, it will likely be desirable to be able to provide backward compatibility so that already developed 32-bit code is able to run on these smartphones. This will allow the wide variety of existing 32-bit mobile applications and other 32-bit code to continue to be used.

The iPhone 5S and iOS 7 provide such backward compatibility. They are able to execute 32-bit code as well as 64-bit code. Also, the 32-bit code is able to use 32-bit libraries.

BRIEF DESCRIPTION OF THE DRAWINGS

The invention may best be understood by referring to the following description and accompanying drawings that are used to illustrate embodiments. In the drawings:

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

FIG. 16 is a block diagram of use of a software instruction converter to convert binary instructions in a source instruction set to binary instructions in a target instruction set, according to embodiments of the invention.

DETAILED DESCRIPTION OF EMBODIMENTS

As discussed in the background section, the iPhone 5S and iOS 7 allow for backward compatibility. Both 32-bit code and 64-bit code are able to execute on the iPhone 5S. The 32-bit code uses a set of 32-bit libraries. Likewise, the 64-bit code uses a set of 64-bit libraries. However, one drawback with this approach for providing backward compatibility is that the iPhone 5S needs to include both 32-bit and 64-bit versions of these libraries. In particular, a set of 32-bit libraries is included for, is linked to, and is used by 32-bit code. Another set of 64-bit libraries is included for, is linked to, and is used by 64-bit code. Storing both the 32-bit libraries and the 64-bit libraries consumes more storage space than would be needed to store a single library.

Disclosed herein are inter-architecture compatibility modules to allow code (e.g., 32-bit code, legacy code, etc.) of a given architecture to use libraries of a different architecture (e.g., 64-bit code, a newer architecture, etc.). In the following description, numerous specific details are set forth (e.g., specific architecture processors and operating systems, difference between new and legacy architectures, examples of inter-architecture compatibility modules, processor configurations, sequences of operations, etc.). However, embodiments may be practiced without these specific details. In other instances, well-known circuits, structures and techniques have not been shown in detail to avoid obscuring the understanding of the description.

Figure 1:
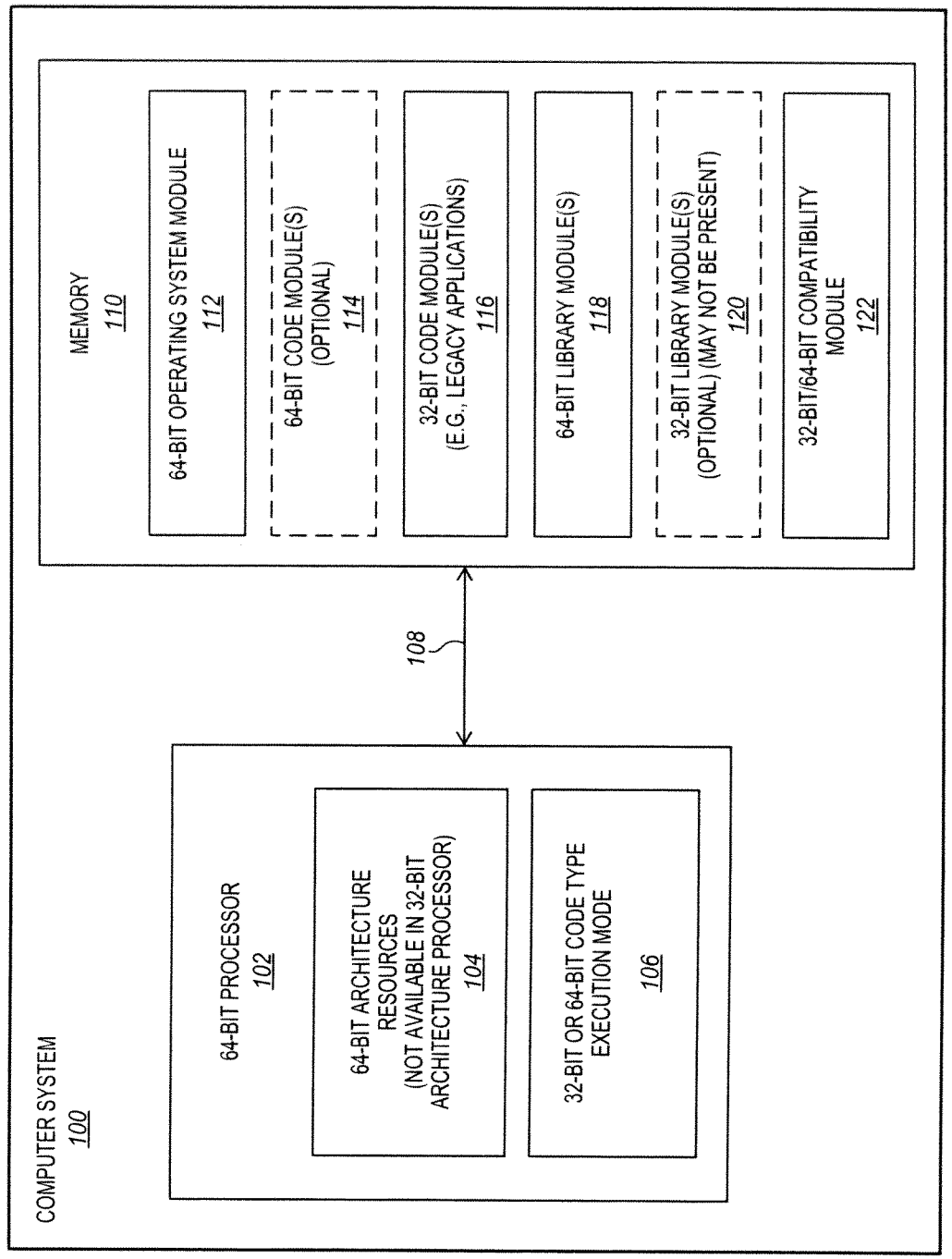
FIG. 1 is a block diagram of a first embodiment of a computer system in which embodiments of the invention may be implemented.

FIG. 1 is a block diagram of a first embodiment of a computer system 100 in which embodiments of the invention may be implemented. In various embodiments, the computer system may include a smartphone, a cellular phone, a mobile phone, a personal digital assistant (PDA), portable media player, hand held device, a tablet computer, a pad computer, a laptop computer, a desktop computer, workstation, video game console, set-top box, server, network device, or other electronic device known in the arts. In some embodiments, the computer system may represent a small handheld computer system with limited memory resources, such as, for example, a smartphone, cellular phone, PDA, tablet computer, or handheld device, although the scope of the invention is not so limited.

The computer system includes an embodiment of a processor 102 and an embodiment of a memory 110. The processor and the memory may be coupled together, or otherwise in communication with one another, by a conventional coupling mechanism 108 (e.g., through one or more buses, hubs, memory controllers, chipset components, or the like). Various different coupling mechanisms known in the arts are suitable. The memory may include one or more memory devices and/or one or more different types of memory as conventionally used in such computer systems.

In the illustrated embodiment, the processor is a 64-bit architecture processor, although the scope of the invention is not so limited. In some embodiments, the processor may be a general-purpose processor. Alternatively, the processor may be a special-purpose processor. Examples of suitable special-purpose processors include, but are not limited to, communications processors, graphics processors, network processors, cryptographic processors, co-processors, embedded processors, digital signal processors (DSPs), and controllers (e.g., microcontrollers), to name just a few examples. The processor may be any of various complex instruction set computing (CISC) processors, reduced instruction set computing (RISC) processors, very long instruction word (VLIW) processors, hybrids thereof, other types of processors, or have a combination of such different processors (e.g., in different cores).

As shown, in some embodiments, the 64-bit architecture processor may have 64-bit architecture resources 104, which are not available to a 32-bit architecture processor. For example, the 64-bit architecture resources may include advanced architectural resources and/or performance enhancing features, which are not found in the 32-bit processor. For example, the 64-bit processor may have additional architectural registers, an enhanced Application Binary Interface (ABI), improved parameter passing logic for procedure calls, or the like. For example, as compared to IA-32 architecture, Intel® 64 architecture has a greater number of registers, additional floating point single instruction, multiple data (SIMD) capabilities, a 64-bit ABI that allows parameter passing by register instead of through stack accesses. These advanced architectural resources and/or performance enhancing features may help to improve performance of software. These resources or features are one of the reasons for the growing trend toward 64-bit computing.

Referring again to FIG. 1, the memory 110 includes various different types of software modules. In the illustrated embodiment, the software modules include a 64-bit operating system module 112. The 64-bit operating system module may include system-level software that is compatible with the 64-bit ABI of the processor. The 64-bit operating system module is generally designed to be able to utilize some or all of the 64-bit architecture resources 104 of the 64-bit processor.

The memory also includes one or more 32-bit code modules 116 and optionally one or more 64-bit code modules 114. In some embodiments, these may include compiled and/or binary code. Examples of such 32-bit and 64-bit code modules include, but are not limited to, application modules.

In the particular case of a smartphone or other mobile device, the application modules may represent mobile applications or apps. In one aspect, the 32-bit code module(s) may represent legacy or existing code modules previously written for a predecessor 32-bit architecture, although the scope of the invention is not so limited. In another aspect, the 32-bit code module(s) may instead be newly written 32-bit code modules. The 32-bit code modules may have been compiled for a 32-bit architecture processor.

The memory also includes 64-bit library modules 118. In some embodiments, as shown by the dashed lines, the memory and/or the computer system may optionally include 32-bit library modules 120. Alternatively, in other embodiments, as shown by the "X" through the 32-bit library modules, the memory and/or the computer system may optionally omit such 32-bit library modules, even when 32-bit code module(s) are stored in the memory and are able to run on the 64-bit processor. Examples of the 32-bit and 64-bit library modules include, but are not limited to, those for the C standard library, math libraries, system libraries, and the like.

During operation, both 32-bit code and 64-bit code may run on the 64-bit processor. For example, instructions or code of the 64-bit operating system module, the 32-bit code module(s), and the 64-bit library modules may execute or run on the 64-bit processor. This may potentially be used to provide backward compatibility by allowing legacy 32-bit applications to run on the newer 64-bit processor. In some embodiments, both 32-bit and 64-bit code may run within the same thread. In some embodiments, the 64-bit processor may have an optional 32-bit or 64-bit code execution mode 106 to indicate whether 64-bit code or 32-bit code (or in some embodiments 32-bit code and also 64-bit code) is currently being executed by the processor. For example, in one embodiment, the mode 106 may represent a first 64-bit mode that allows 64-bit code but not 32-bit code to execute on the 64-bit processor, and a second 32-bit mode that allows 32-bit code to execute on the 64-bit processor. In one aspect, the 32-bit mode may also allow 64-bit code to execute on the 64-bit processor. In another aspect, the 32-bit mode may not allow 64-bit code to execute on the 64-bit processor. The 64-bit processor may optionally operate by default in 64-bit mode, until a mode change is made to enter into the 32-bit mode, although this is not required. Other processors need not necessarily have different modes to execute different types of code (e.g., may have a 32-bit/64-bit mixed mode).

As discussed above, the iPhone 5S also allows for backward compatibility by allowing 32-bit code to run on a 64-bit architecture. This is done by having both 32-bit and 64-bit versions of libraries. A first set of 32-bit libraries is included for, is linked to, and is used by 32-bit code (e.g., 32-bit legacy mobile applications). A second set of 64-bit libraries is included for, is linked to, and is used by 64-bit code. The 32-bit code is only able to use the 32-bit library modules. However, one potential drawback with this approach is the need to continue to provide 32-bit libraries for use by the 32-bit code. For one thing, additional storage space is needed to store the 32-bit libraries. Especially for smartphones, tablet computers, and other small electronic devices, the amount of storage space generally tends to be limited. Also, the additional storage space needed to accommodate the 32-bit libraries may tend to add to the overall manufacturing cost of the device.

Another potential drawback with this approach is that the 32-bit code is only able to use the 32-bit libraries but not the 64-bit libraries. This may tend to limit performance, since the 32-bit libraries are generally not designed to be able to utilize the 64-bit architecture resources 104 (e.g., advanced architectural and/or performance enhancing resources). These resources generally are not available to the counterpart (e.g., predecessor) 32-bit architecture processor on which the 32-bit libraries were intended to run. The 32-bit libraries were not designed to use, and are not able to use, all of these 64-bit architecture resources. Consequently, the 32-bit libraries are generally not able to realize the increase in performance due to the 64-bit architecture resources which can be realized by the 64-bit libraries.

Referring again to FIG. 1, the computer system includes an embodiment of a 32-bit to and/or from 64-bit (32-bit/64-bit) compatibility module 122. The 32-bit/64-bit compatibility module is one example of an inter-architecture compatibility module for 32-bit and 64-bit architectures, although in other embodiments other architectures may be used instead. In some embodiments, the 32-bit/64-bit compatibility module may be configured or operable to allow the 32-bit module(s) 116 to interface to and use the 64-bit library modules 118 (e.g., C standard library, math libraries, glibc, system libraries, etc.). In some embodiments, the compatibility module may allow the 32-bit code to use any arbitrary 64-bit library module in its address space (e.g., as opposed to just a limited set of special modules like WoW64.dll, WoW64Win.dll, WoW64Cpu.dll, or Ntdll.dll). The 32-bit/64-bit compatibility module may be configured or operable to make various compatibility changes appropriate to allow the 32-bit code module(s) to use the 64-bit library modules. For example, these changes may include changes to account for differences between the ABIs of the 32-bit code module(s) and the 64-bit library modules. In some embodiments, the 32-bit/64-bit compatibility module may include a binary translation module. In some embodiments, the 32-bit/64-bit compatibility module may be configured or operable to make code type execution mode changes (e.g., to change between 32-bit and 64-bit code execution modes). In various embodiments, the 32-bit/64-bit compatibility module may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), software (e.g., higher-level instructions stored in memory), or a combination thereof.

Advantageously, the compatibility module may help to provide backward compatibility and allow the 32-bit code module(s) to be executed or run on the 64-bit processor in the system having the 64-bit operating system module. Since the 32-bit code module(s) are able to use the 64-bit library modules, and are not required to use the 32-bit library modules, the 32-bit library modules may optionally be omitted, in some embodiments. That is, in some embodiments, the memory and/or the computer system may not have the 32-bit library modules. Advantageously, omitting the 32-bit library modules may help to free up storage space that would otherwise be needed to store them and/or may help to reduce the cost of manufacturing the system by needing to provide a lesser overall amount of storage space. Especially for smartphones, tablet computers, and other relatively small electronic devices, avoiding needing to store the 32-bit library modules may offer an advantage. Alternatively, in other embodiments, the 32-bit library modules may be included, if desired. In some embodiments, at least one 32-bit code module may be able to use at least one 64-bit library module with the use of the compatibility module, even if other 32-bit code modules use 32-bit library modules.

Advantageously, allowing the 32-bit code modules to use the 64-bit library modules may also help to improve performance. For example, the 64-bit library modules as compared to the 32-bit library modules may be better able to utilize the 64-bit architecture resources 104 (e.g., advanced architectural and/or performance enhancing resources) of the 64-bit processor. For example, the 64-bit library modules may be able to use more registers than are available to the 32-bit library modules, the 64-bit library modules may be able to pass parameters via registers instead of the stack as in the case of the 32-bit library modules, etc. As a result, if the 32-bit code module(s) are able to have the 64-bit library modules perform certain needed processing, instead of the 32-bit library modules, the 64-bit library modules may be able to perform the processing faster and/or deliver the needed results sooner. This may help to improve performance over what could have been achieved if 32-bit library modules were instead used to perform this processing.

FIG. 1 shows a 64-bit processor, a 64-bit operating system, and 64-bit and 32-bit code and library modules. However, the scope of the invention is not so limited. In other embodiments, other architectures may optionally be used. For example, in some embodiments, an X-bit architecture code module may use a Y-bit architecture library module and may run on a Y-bit architecture processor using a Y-bit architecture operating system, where X and Y are different.

Figure 2:
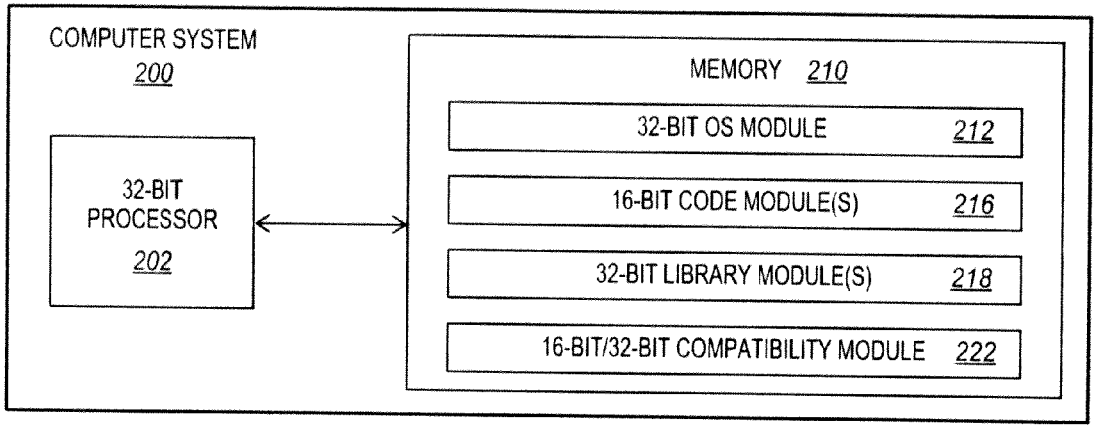
FIG. 2 is a block diagram of a second embodiment of a computer system in which embodiments of the invention may be implemented.
Figure 3:
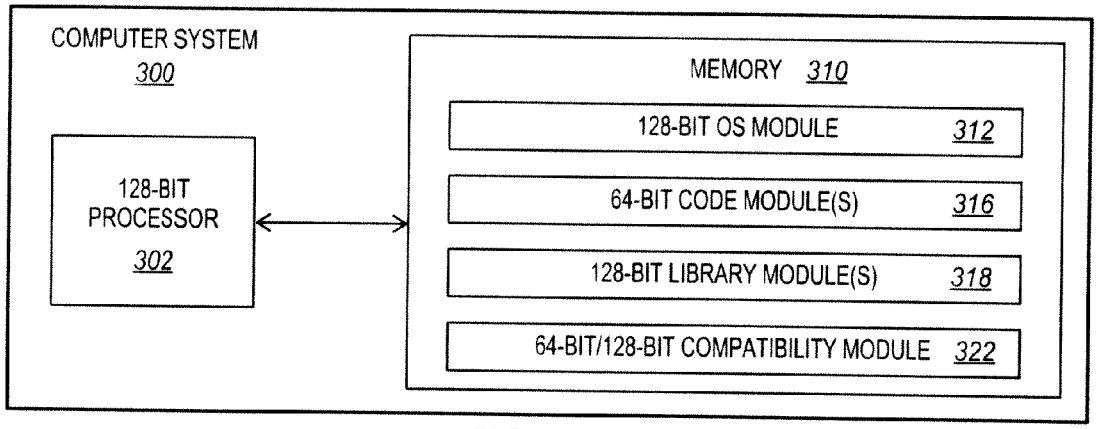
FIG. 3 is a block diagram of a third embodiment of a computer system in which embodiments of the invention may be implemented.
Figure 4:
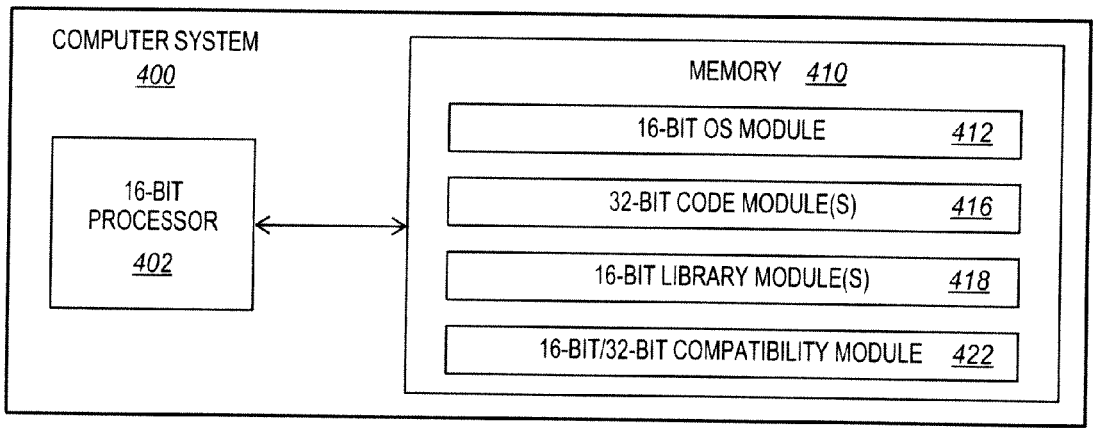
FIG. 4 is a block diagram of a fourth embodiment of a computer system in which embodiments of the invention may be implemented.

To further illustrate, FIGS. 2-4 show several other embodiments of computer systems in which embodiments of the invention may be implemented. The computer systems of FIGS. 2-4 and their components have certain similarities to the computer system of FIG. 1. To avoid obscuring the description, the different and/or additional characteristics of these computer systems and their components will primarily be described without repeating all the similar characteristics. However, it is to be appreciated that these computer systems and components may have the same, similar, or corresponding characteristics of the correspond components of FIG. 1.

FIG. 2 is a block diagram of a second embodiment of a computer system 200 having a 16-bit to and/or from 32-bit (16-bit/32-bit) compatibility module 222. The computer system includes a 32-bit processor 202 and a memory 210. The memory stores a 32-bit operating system module 212, one or more 16-bit code module(s) 216, and 32-bit library modules 218. The 16-bit/32-bit compatibility module may allow the 16-bit code module(s) to use the 32-bit library modules. The memory may also optionally store one or more 32-bit code module(s) (not shown), which may also optionally use the 32-bit library modules. In some embodiments, the memory and/or the computer system may also have 16-bit library modules. Alternatively, the 16-bit library modules may optionally be omitted.

FIG. 3 is a block diagram of a third embodiment of a computer system 300 having a 64-bit to and/or from 128-bit (64-bit/128-bit) compatibility module 322. The computer system also includes a 128-bit processor 302 and a memory 310. The memory stores a 128-bit operating system module 312, one or more 64-bit code module(s) 316, and 128-bit library modules 318. The 64-bit/128-bit compatibility module may allow the 64-bit code module(s) to use the 128-bit library modules. The memory may also optionally store one or more 128-bit code module(s) (not shown), which may also optionally use the 128-bit library modules. In some embodiments, the memory and/or the computer system may also have 64-bit library modules. Alternatively, the 64-bit library modules may optionally be omitted.

FIG. 4 is a block diagram of a fourth embodiment of a computer system 400 having a 16-bit to and/or from 32-bit (16-bit/32-bit) compatibility module 422. The computer system also includes a 16-bit processor 402 and a memory 410. The memory stores a 16-bit operating system module 412, one or more 32-bit code module(s) 416, and 16-bit library modules 418. The 16-bit/32-bit compatibility module may allow the 32-bit code module(s) to use the 16-bit library modules. The memory may also optionally store one or more 16-bit code module(s) (not shown), which may also optionally use the 16-bit library modules. In some embodiments, the memory and/or the computer system may also have 32-bit library modules. Alternatively, the 32-bit library modules may optionally be omitted.

These are just a few additional examples. Still other embodiments are contemplated. For example, in yet another embodiment, a 32-bit to and/or from 64-bit (32-bit/64-bit) compatibility module may allow 64-bit code modules to use 32-bit library modules and may run on a 32-bit processor with a 32-bit operating system. To illustrate certain concepts, 32-bit code modules, 64-bit processors, 64-bit operating systems, and 32-bit/64-bit compatibility modules will often be shown and described in the figures. However, it is to be appreciated that in other embodiments other architectural variations described elsewhere herein are suitable.

Figure 5:
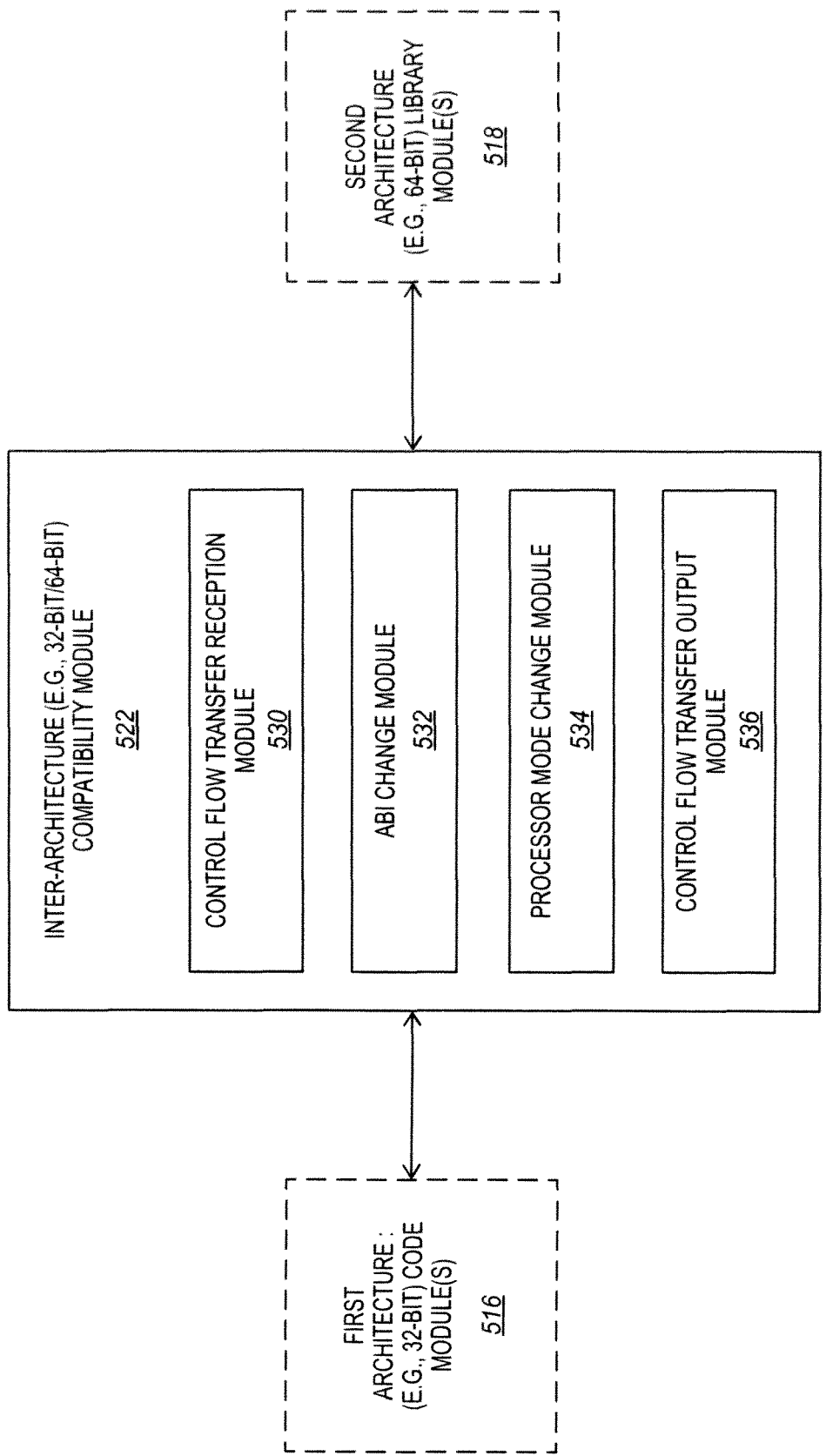
FIG. 5 is a block diagram of an embodiment of an inter-architecture compatibility module.

FIG. 5 is a block diagram of an embodiment of a first architecture (e.g., 32-bit) to and/or from second architecture (e.g., 64-bit) compatibility module 522. The first architecture/second architecture compatibility module is operable to make one or more first architecture (e.g., 32-bit) code module(s) 516 compatible with, and able to use, a set of second architecture (e.g., 64-bit) library modules 518. The first architecture/second architecture compatibility module is coupled between, or otherwise in communication between, the first architecture code module(s) and the second architecture library modules. In the illustration, the first architecture code module(s) and the second architecture library modules are shown in dashed lines to indicate that they are not part of the invention.

The compatibility module includes a control flow transfer reception module 530. The control flow transfer reception module may be configured or operable to intercept or otherwise receive an input control flow transfer operation, such as, for example, a call procedure operation from a first architecture code module, or a return from procedure operation from the second architecture library module. The control flow transfer reception module may also be configured or operable to receive one or more input arguments or other parameters corresponding to a received input control flow transfer operation. For example, these parameters may be retrieved from the stack, from registers used to pass such parameters, or otherwise.

The compatibility module also includes an ABI change module 532. The ABI generally represents an interface between two program modules, one of which is often a library module or operating system module, at the level of machine code. An ABI commonly includes details such as the sizes, layouts, and alignment of data, how functions are called, the details of calling conventions and how information should be passed between program modules (e.g., how arguments are passed and return values retrieved), and the like. For example, the ABI may specify whether parameters are passed between modules via the stack or registers, which particular registers are used, in what order the parameters are put on the stack, etc. Commonly there will be at least some differences between the ABI of the first architecture (e.g., 32-bit) code module(s) and the ABI of the second architecture (e.g., 64-bit) library modules. The ABI change module may be configured or operable to make changes to help bridge the gap between these ABI differences. The ABI change module may make various different types of ABI changes depending upon the particular first and second architectures and ABIs involved. For example, the ABI change module may make ABI changes needed to map or relay an input control flow transfer operation and its associated parameters to a corresponding output control flow transfer operation and its associated parameters. As one example, the ABI change module may make ABI changes needed to map or relay a call procedure operation received from the first architecture code module(s) to the different calling conventions of a corresponding call procedure operation to be output to the second architecture library modules (e.g., possibly mapping input parameters provided via the stack to corresponding output parameters passed in registers). In some embodiments, depending on the particular ABIs, data sizes or formats of input parameters may also be changed to corresponding sizes or formats of output parameters. As another example, the ABI change module may make ABI changes needed to map or relay a return from procedure operation received from the second architecture library modules to the different calling conventions of a corresponding return from procedure operation to be provided to the first architecture code module(s) (e.g., possibly mapping input parameters passed in registers to corresponding output parameters provided via the stack).

Referring again to FIG. 5, the compatibility module also includes a processor mode change module 534. The processor mode change module may be configured or operable to change the code type execution mode of the processor when appropriate to indicate the particular type of code to be executed (e.g., 32-bit or 64-bit code). As previously mentioned, some processors may have different modes in which these different types of code may be executed, although this is not required. For example, in some embodiments, a 64-bit processor may have a first 64-bit mode that allows 64-bit code but not 32-bit code to execute, and a second 32-bit mode that allows 32-bit code to execute. In some cases the second 32-bit mode may also allow 64-bit code to execute, but in other cases the 32-bit mode may not allow 64-bit code to execute. Other processors may have different modes (for code other than 32-bit and/or 64-bit code), additional modes (e.g., for 16-bit code in addition to 32-bit and 64-bit code), etc. Still other processors need not necessarily have different modes for different types of code. For example, a processor may optionally/potentially have a single mixed mode (e.g., a 32-bit/64-bit mixed mode), where different types of code may be executed. In such cases, the processor mode change module may optionally be omitted.

Different types of processors may implement different code type execution modes in different ways. As one illustrative example, certain 64-bit processors available from Intel Corporation, of Santa Clara, Calif., indicate 64-bit and 32-bit/64-bit mixed compatibility modes via a code segment descriptor. The code segment descriptor is used in memory segmentation. Memory segmentation generally refers to dividing a memory into segments or sections. A reference to a memory location or a memory address generally includes a segment identifier and an offset within the identified segment. Specifically, in these 64-bit processors, the code segment descriptor has a particular bit, which is known as an L-bit, to indicate the code type execution mode. According to the adopted convention, the L-bit is cleared to binary zero (i.e., 0) to indicate a 64-bit mode, where 64-bit code but not 32-bit code is allowed to execute. Conversely, the L-bit is set to binary one (i.e., 1) to indicate a 32-bit/64-bit mixed compatibility mode, where both 32-bit code and 64-bit code may execute.

In such embodiments, where the code type execution mode is indicated via the code segment descriptor, the processor mode change module may be operable or configured to make mode change determinations based on the L-bit, the code segment descriptor, based on what segment the code to be executed is in, etc. For example, in some embodiments, different types of code may be kept in different segments, although this is not required in other embodiments. For example, there may be one or more 32-bit code segments having 32-bit code but not 64-bit code, and one or more 64-bit code segments having 64-bit code but not 32-bit code. In one example, there is a single 32-bit code segment, one 64-bit code segment for 64-bit operating system code, and one 64-bit code segment for 64-bit user-level code and 64-bit libraries, although the scope of the invention is not so limited. These 32-bit and 64-bit code segments may be represented in the local descriptor table (LDT). In such embodiments, all control flow transfer operations between the 32-bit code segment(s) and the 64-bit segment(s) may use inter-segment or so-called "far" control flow transfers. In other words, a transition from executing 64-bit code to executing 32-bit code, or from executing 32-bit code to executing 64-bit code, may only occur following a far or inter-segment control flow transfer from another segment. In such embodiments, such far or inter-segment control flow transfer operations may be examined to know when the transfer is between segments for different types of code. In such a case, this may be used to make a processor code type execution mode change determination. Other processors may indicate such code type execution modes and/or make mode change determinations differently.

As mentioned above, in some embodiments, there may be one or more 32-bit code segments. In some embodiments, 32-bit code modules (e.g., having legacy code) may have been compiled based on flat addressing. In flat addressing, the base address of code and data segments may have been set to zero. Also, both the code and data segments may have been set to a limit or maximum of four gigabytes. In some embodiments, the one or more created 32-bit code segment(s) having these 32-bit code modules may also be configured to use such a flat addressing approach. This may help to avoid breaking the assumptions made during initial compilation of the 32-bit code modules and/or needing to recompile the 32-bit code modules.

Referring again to FIG. 5, the compatibility module also includes a control flow transfer output module 536. The control flow transfer output module may be configured or operable to output or provide an output control flow transfer operation corresponding to an input control flow transfer operation that was previously received by the control flow transfer reception module. The control flow transfer output module may also be configured or operable to perform the output control flow transfer operation using the calling convention guidelines appropriate for the target or destination module and according to the ABI changes made by the ABI change module. By way of example, the control flow transfer output module may output a call procedure operation to the second architecture library modules that corresponds to an initial call procedure operation received from the first architecture code module(s) by the control flow transfer reception module, and that reflects changes made by the ABI change module.

Figure 6:
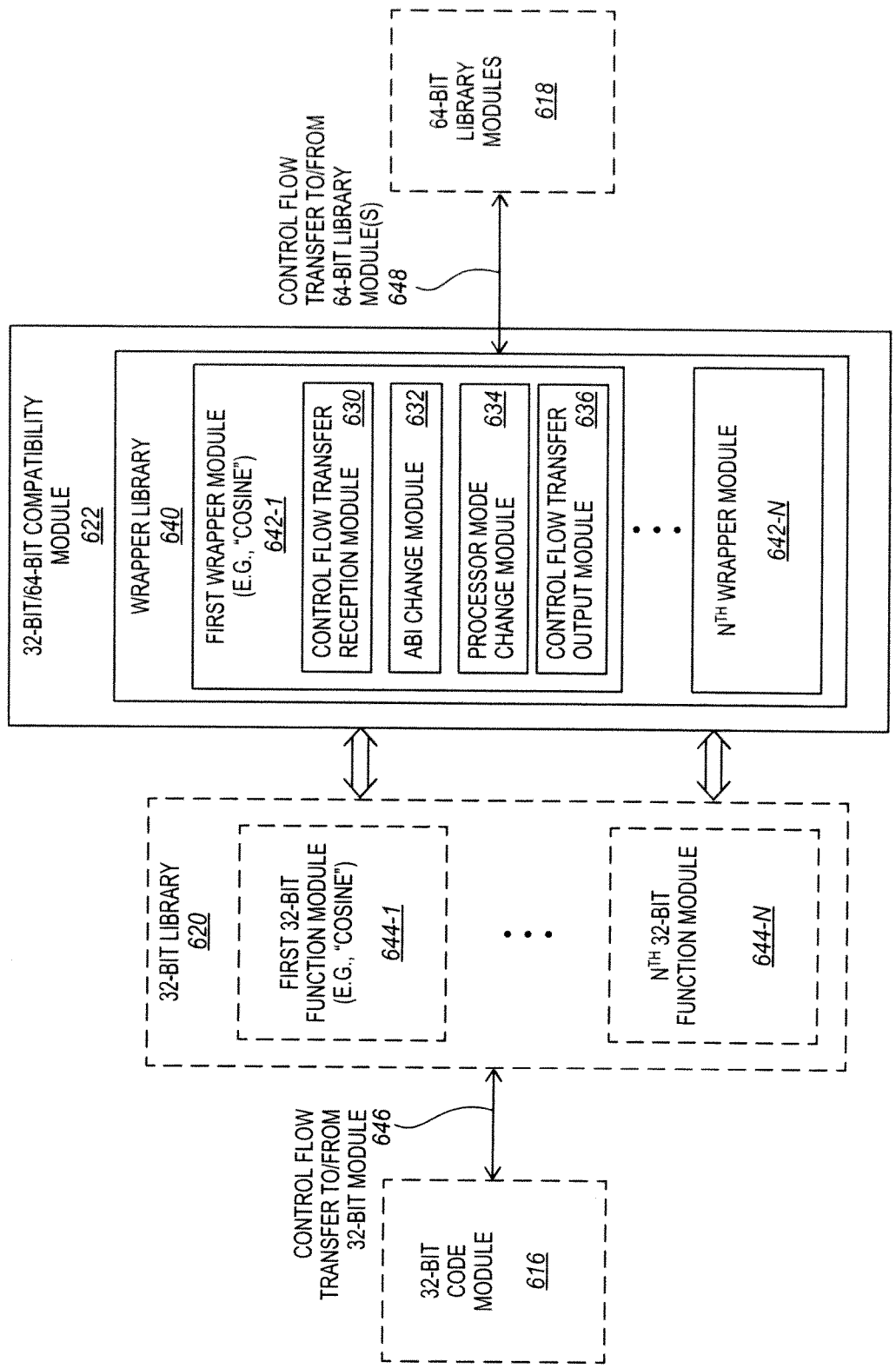
FIG. 6 is a block diagram of an embodiment of an inter-architecture compatibility module having a wrapper library.

FIG. 6 is a block diagram of an embodiment of a 32-bit/64-bit compatibility module 622 having a wrapper library 640. In some embodiments, the wrapper library may correspond to and mirror one or more corresponding actual libraries 620 of a given architecture, which in the illustration is a 32-bit library 620. In some embodiments, the wrapper library may have a wrapper module for each corresponding function module in the actual library or libraries (e.g., the 32-bit library). In the illustrated embodiment, the 32-bit library includes a first 32-bit function module 644-1 (e.g., having a name "cosine") through an Nth 32-bit function module 644-N, where N may be any number appropriate for the particular implementation. Similarly, the wrapper library includes a first wrapper module 642-1 (e.g., also having a name "cosine") through an Nth wrapper module 642-N. The first 32-bit function module corresponds to the first wrapper module up through the Nth 32-bit function module corresponds to the Nth wrapper module. In some embodiments, the wrapper library may include a wrapper module for each function module in a 32-bit C standard library, a wrapper module for each function module in one or a set of libraries (e.g., a 32-bit threading library, a 32-bit math library, a 32-bit system library, etc.), although the scope of the invention is not so limited. In some embodiments, a set of 64-bit library modules 618 (e.g., a 64-bit library) may have a 64-bit library module for each corresponding function module in the 32-bit library 620 and/or for each wrapper module in the wrapper library 640, although this is not required.

In some embodiments, the wrapper library may intercept or otherwise receive control flow transfer operations from the 32-bit code module intended for a 32-bit library. For example, the 32-bit code module may issue a control flow transfer operation (e.g., a call procedure operation) to the first 32-bit function module (e.g., having a name "cosine"), and the corresponding first wrapper module (e.g., also having the name "cosine") may intercept this control flow transfer operation. The wrapper module may process the received control flow transfer operation as described elsewhere herein. For example, the illustrated first wrapper module has a control flow transfer reception module 630, an ABI change module 632, a processor mode change module 634, and a control flow transfer output module 636. Each of these may be similar to, or the same as, those described elsewhere herein (e.g., in conjunction with FIG. 5).

The control flow transfer output module may provide a corresponding or derived call procedure function to the 64-bit library modules. In some embodiments, the wrapper library may also intercept or otherwise receive control flow transfer operations from the 64-bit library modules. For example, the 64-bit library module(s) may issue a responsive return from procedure operation, and the corresponding first wrapper module may intercept this control flow transfer operation. The first wrapper module may process the received return from procedure operation as previously described (e.g., making ABI changes, etc.) and provide a corresponding or derived return from procedure operation to the 32-bit code module. In some embodiments, the wrapper module may logically be partitioned into a trampoline module to transfer control (e.g., on a call) from a caller 32-bit code module a 64-bit library module, and a reverse trampoline or return stub to transfer control (e.g., on a return) from the 64-bit library module to the 32-bit code module.

The above-described embodiment refers to a 32-bit code module, a 32-bit library, a 64-bit library, and a 32-bit/64-bit compatibility module, although the scope of the invention is not so limited. In other embodiments, these references to the 32-bit code module, the 32-bit library, the 64-bit library, and the 32-bit/64-bit compatibility module may be replaced by other architectural variants described elsewhere herein (e.g., those shown and described for FIGS. 2-4).

Figure 7:
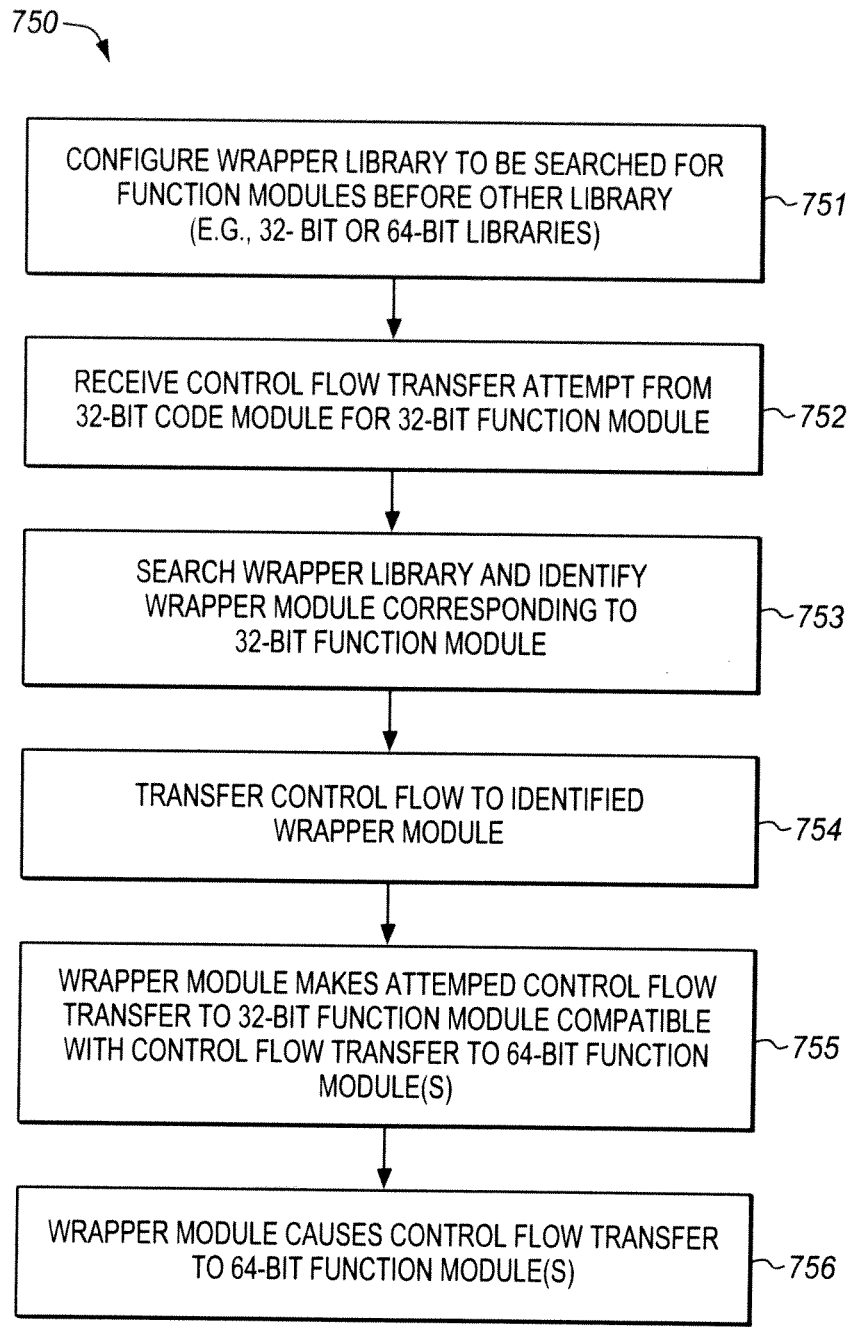
FIG. 7 is a block flow diagram of an embodiment of a method of intercepting control flow transfers with a wrapper library of an inter-architecture compatibility module using function inter-positioning.

FIG. 7 is a block flow diagram of an embodiment of a method 750 of intercepting control flow transfers with a wrapper library of an inter-architecture compatibility module using function inter-positioning. In some embodiments, the method may be performed with the wrapper library 640 of FIG. 6. Alternatively, similar or different wrapper libraries may optionally be used.

The method includes configuring the wrapper library to be searched for function modules before one or more other libraries are searched, at block 751. For example, this may include configuring the wrapper library to be searched for a function module before a 64-bit library is searched for the function module and/or before an optional 32-bit library (if one is present) is searched for the function module. Optionally, the wrapper library may be configured to be searched before any other library is searched. In some embodiments, configuring the wrapper library to be searched before the one or more other libraries may be done by taking advantage of the order in which a dynamic linker module searches for functions. Commonly, the dynamic linker module may search for a function at runtime in the libraries in the order in which the libraries have been loaded. If a first library is loaded before a second library, then the dynamic linker module may search for the desired function in the first library before searching for the desired function in the second library. Accordingly, the wrapper library may be loaded before any other libraries that the wrapper library is intended or desired to be searched prior to. In some embodiments, this may be done by preloading the wrapper library, such as, for example, by using the command LD_PRELOAD. Alternatively, other ways of loading the wrapper library may be used. In one aspect, the wrapper library may be preloaded or loaded prior to the first control flow transfer operation from a code module involving a library module that is desired to be intercepted by a wrapper module.

The method includes receiving a control flow transfer attempt from the 32-bit code module intended for a 32-bit function module of a set of 32-bit library modules, at block 752. By way of example, this may include receiving a call procedure operation indicating a particular 32-bit library function module (e.g., having a particular function name).

The method includes searching the wrapper library (e.g., before searching the 32-bit library modules if they exist and/or before searching the 64-bit library modules) and identifying a wrapper module corresponding to the 32-bit function module, at block 753. In some embodiments, the identified wrapper module may have a same function name as the desired actual library module (e.g., a 32-bit library module). For example, the wrapper library may be searched for the 32-bit library function module named "cosine" and a wrapper module also named "cosine" may be identified. Alternatively, a mapping table or other way of providing a correspondence between wrapper modules and 32-bit library function modules besides based on their names may optionally be used.

The method includes transferring control flow to the identified wrapper module, at block 754. Advantageously, since the wrapper library was configured to be searched before the one or more other libraries, the control flow transfer was to the identified wrapper module instead of to the actual library module. The wrapper module was essentially logically disposed or inter-positioned between the 32-bit code module and the actual library modules.

The wrapper module makes the attempted control flow transfer to the 32-bit function module compatible with the control flow transfer to one or more 64-bit function module(s), at block 755. This may be done as described elsewhere herein. For example, input parameters may be mapped to output parameters, other ABI changes may be made, output calling conventions may be conformed to, etc.

The wrapper module causes the control flow transfer to the one or more 64-bit function module(s), at block 756. For example, the wrapper module may provide a control flow transfer operation corresponding to, and generally reflecting, the control flow transfer attempt received at block 752.

The above-described method refers to a 32-bit code module, a 32-bit library function module, and a 64-bit library function module, although the scope of the invention is not so limited. In other embodiments, these references to the 32-bit code module, the 32-bit library function module, and the 64-bit library function module may be replaced by other architectural variants described elsewhere herein (e.g., those shown and described for FIGS. 2-4).

Figure 8:
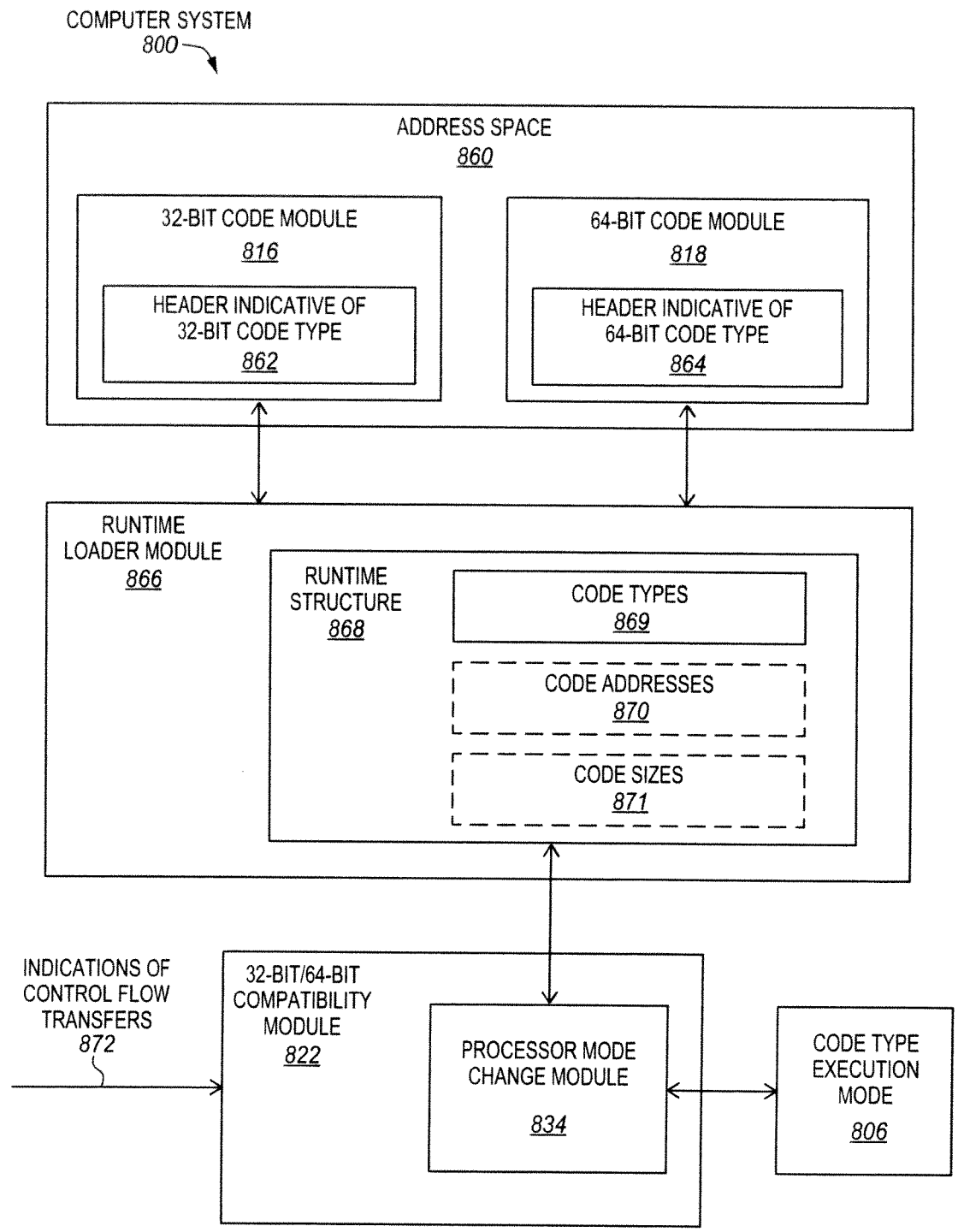
FIG. 8 is a block diagram of an inter-architecture compatibility module that is operable to use a runtime structure of a dynamic loader module to determine when to change compatibility modes.

FIG. 8 is a block diagram of a computer system 800 having an inter-architecture compatibility module 822 that is configured or operable to determine transfers between different types of code 816, 818 by accessing a runtime structure 868. The computer system has an address space 860. The address space includes different types of code 816, 818. In the illustrated example embodiment, these different types of code include a 32-bit code module 816 and a 64-bit code module 818, although the scope of the invention is not so limited. Accordingly, in some embodiments, two or more different types of code (e.g., 32-bit and 64-bit code) may be included or intermixed in the same address space. Conventionally, including such different types of code modules in the same address space generally is not done. The 32-bit code module has a header 862 that is indicative of the 32-bit code type. Similarly, the 64-bit code module has a header 864 that is indicative of the different 64-bit code type. One possible example of a suitable type of header is an Executable and Linkable Format (ELF) header.

The computer system also includes a runtime or dynamic loader module 866. The dynamic loader module may have a function of runtime loading of binary executables. The runtime loader module allows the two or more different types of code (e.g., 32-bit code and 64-bit code) to be included or intermixed in the same address space. Convention runtime libraries, such as runtime loader, generally do not allow such different types of code to be included or intermixed in the same address space. The runtime loader module has a runtime structure 868 (e.g., a data structure). The runtime loader module may be configured or operable to keep track of the type of code or library module (e.g., whether it is 32-bit or 64-bit) at the time of loading that code or library module into the address space. For example, the runtime loader module may access the headers 862, 864 of the 32-bit and 64-bit code modules and determine the indicated types of code. The runtime loader module may store the code types 869 in the runtime structure. The runtime loader module may also optionally store the code addresses 870 (e.g., a base runtime address of the code section) and/or the code sizes 871 in the runtime structure, although this is not required. In some embodiments, other system binary modules that make up the runtime loader module 866 and/or that help to implement aspects of dynamic loading may also be modified. For example, linker, loader, and glibc may be modified to allow different types of code to be included or intermixed in the same address space. By way of example, such modules may be modified to interface to and utilize the runtime structure 868 and the code types 869.

Referring again to FIG. 8, the computer system also includes the inter-architecture compatibility module 822. In the illustrated example, the compatibility module is a 32-bit/64-bit compatibility module, although the scope of the invention is not so limited. The 32-bit/64-bit compatibility module includes a processor mode change module 834. The processor mode change module and/or the 32-bit/64-bit compatibility module are coupled with, or otherwise in communication with, the runtime loader module and/or the runtime structure. The processor mode change module and/or the 32-bit/64-bit compatibility module are also coupled with, or otherwise in communication with, a code type execution mode 806 of a processor.

In some embodiments, the 32-bit/64-bit compatibility module 822 may be configured or operable to determine whether or not control flow transfers are between different types of code, for example between 32-bit and 64-bit code, by accessing the runtime structure 868. For example, the compatibility module may use the runtime structure to determine whether target code, to which a control flow transfer is being made, is 32-bit or 64-bit code. In some embodiments, whenever a control flow transfer operation is performed (or in some embodiments whenever a far or inter-segment control flow transfer operation is performed), the processor mode change module may access the code types 869 in the runtime structure. In some embodiments, the compatibility module may receive an indication of such control flow transfer operations 872. The processor mode change module may be operable to use these code types to determine whether the type of code at the target location is the same as the current type of code and/or whether the current code type execution mode 806 of the processor needs to be changed.

The inter-architecture compatibility modules described herein may be implemented in different ways in different embodiments. To further illustrate certain concepts, it may be helpful to consider further details of one possible example of a way in which an inter-architecture compatibility module may be implemented in a 64-bit version of an Android environment. Android is an operating system based on the Linux kernel used largely for touchscreen mobile devices such as smartphones and tablet computers. The expected 64-bit Android environment may include a 64-ABI compatible version of the Android framework (Dalvik, zygote, system libraries such as libc, etc.) and a Linux kernel running on a 64-bit processor. The 64-bit ABI compatible Dalvik, which is the process virtual machine of Android, may include an ability of Dalvik to handle a JNI call to a 64-bit library and to generate 64-bit JIT (Just-in-Time) code.

There are different types of Android applications. One type of is purely Java applications. Purely Java applications contain only Java byte code but not native or architecture-specific code. Android may execute such purely Java applications by invoking the Dalvik virtual machine. Generally, purely Java applications may be executed without further changes to the Android environment.

Another type of Android application is a native application. Native applications contain native or architecture-specific code. For example, native applications may have both Java byte code and native code. Math libraries, graphics libraries, system libraries, C standard libraries, and the like, may fall into this category. The native code may be executed by using Java's JNI (Java Native Interface) technology. For example, the native application may use the JNI interface to call native methods. The call to the native method may be represented using invoke_direct Dalvik byte code in Dex file. The invoke_direct may invoke a method with parameters and/or indicate a method to call. In some embodiments, the way in which the invoke_direct byte code in Dalvik is implemented may be modified to allow for inter-architecture operability and compatibility (e.g., allow a 32-bit code module to use a 64-bit library module and the 64-bit ABI).

To further illustrate, consider a representative call stack flow used to implement invoke_direct byte code in Dalvik. When an application calls a native library module, Dalvik uses a System.loadLibrary call to load the native library module into the address space. Then, Dalvik's System.loadLibrary calls into Runtime.loadLibrary. Runtime.loadLibrary then makes a JNI call to nativeLoad. Then, nativeLoad calls to dvmLoadNativeCode. This module, dvmLoadNativeCode implements the core of loadLibrary. For example, conventionally, dvmLoadNativeCode would load a 32-bit native library module in response to the call to the 32-bit native library module from a 32-bit code module.

In some embodiments, invoke_direct may be modified to allow for inter-architecture operability and compatibility as described elsewhere herein. For example, invoke_direct may be modified to allow a 32-bit code module to use a 64-bit library module and the 64-bit ABI (e.g., map a call to a 32-bit native library module to a call to a 64-bit native library module). For example, the invoke_direct may be modified to intercept a call from a 32-bit code module (e.g., a mobile app) intended for a 32-bit native library module, and make appropriate ABI changes to map the received call to a corresponding output call to the 64-bit native library module. In some embodiments, invoke_direct may optionally include wrapper modules with characteristics as described elsewhere herein, although this is not required. In some embodiments, the order in which the native library modules is searched may be controlled so that a wrapper module is identified first (e.g., before a 32-bit native library module and/or a 64-bit library module). For example, the priorities of paths to wrapper modules may given more priority over the paths to 32-bit and 64-bit native library modules. This may be used to allow a wrapper module to intercept a call (e.g., to a 32-bit library module).

In some embodiments, dvmLoadNativeCode may also be modified to keep track of the type of code (e.g., 32-bit code or 64-bit code) being executed (e.g., to implement processor code type execution mode switches). For example, dvmLoadNativeCode may be modified to include and use a runtime structure and/or code type information (e.g., similar to the code type 869 of FIG. 8).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU;

3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
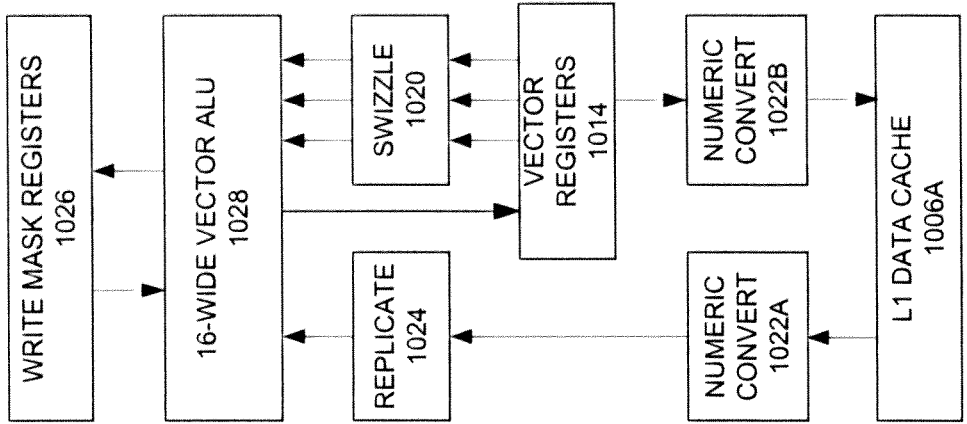
FIG. 10B is a block diagram of an embodiment of an expanded view of part of the processor core of FIG. 10A.
Figure 10A:
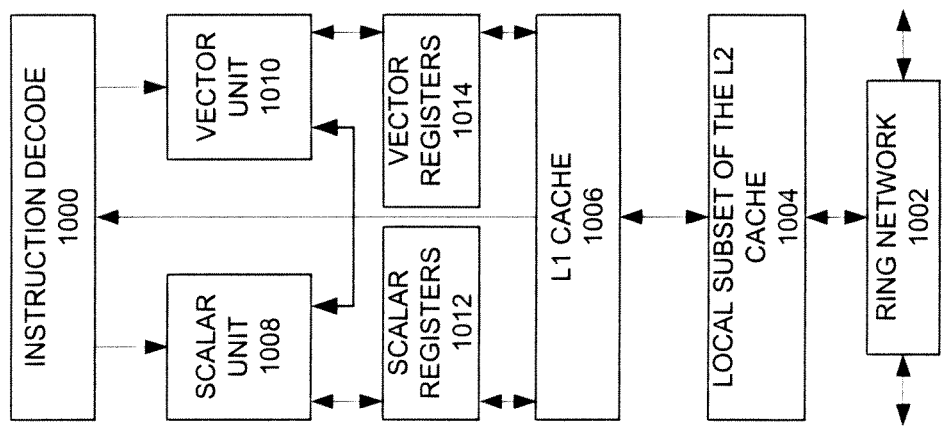
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bidirectional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
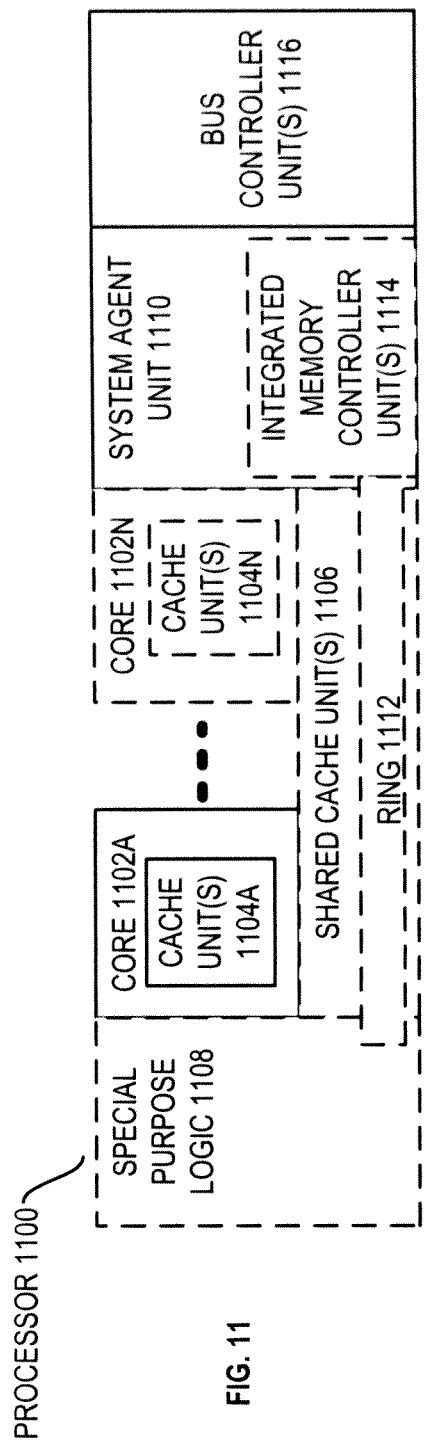
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
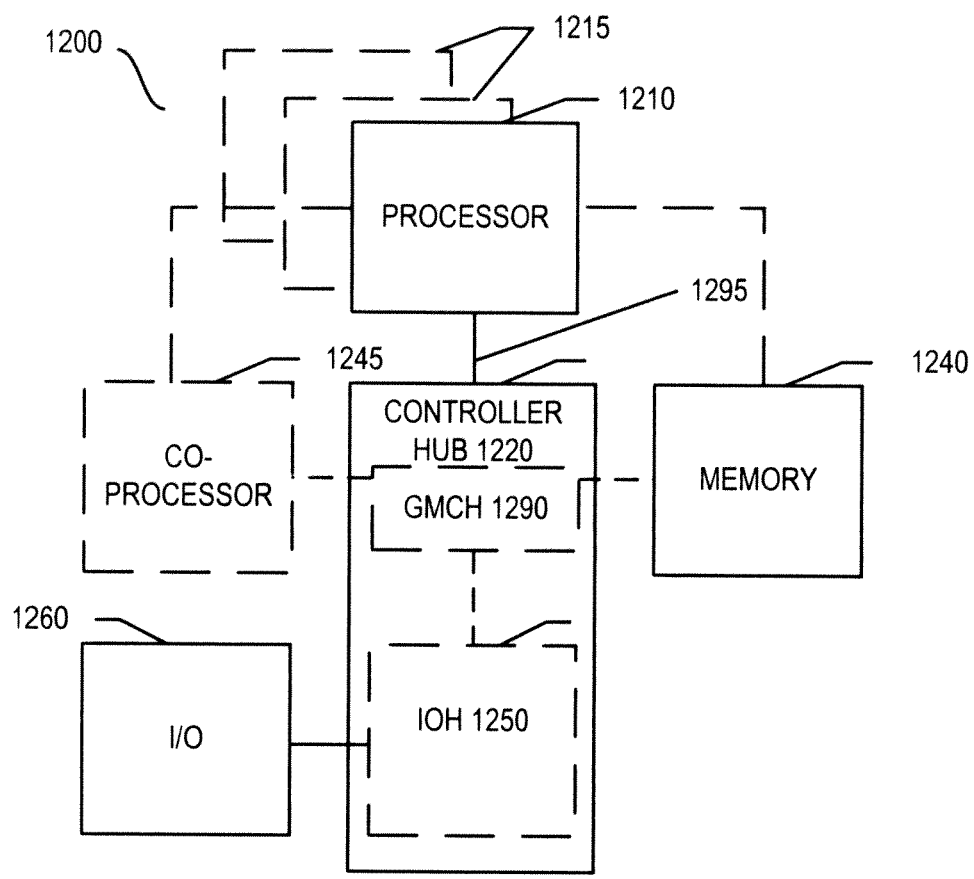
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
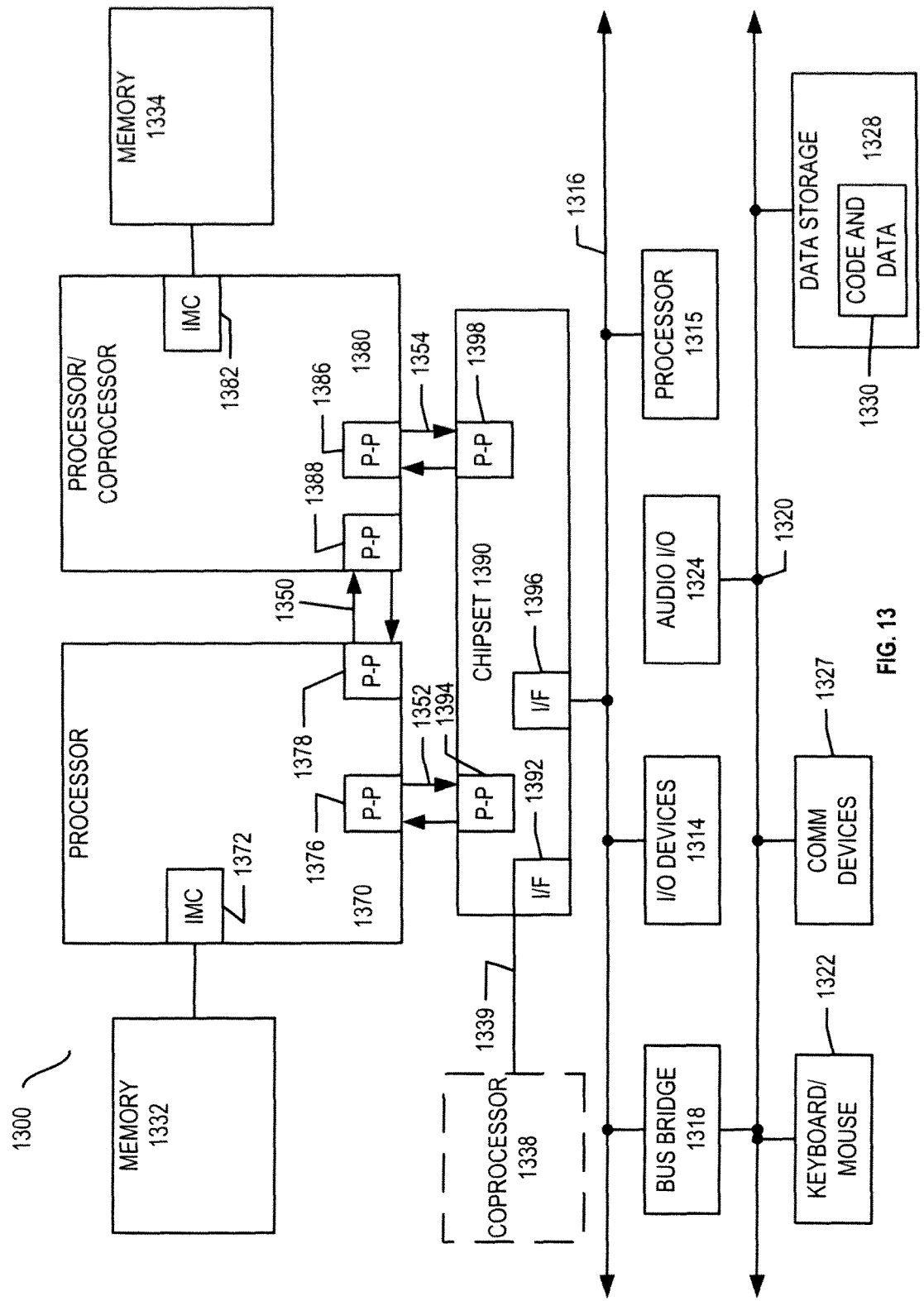
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPG-PU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
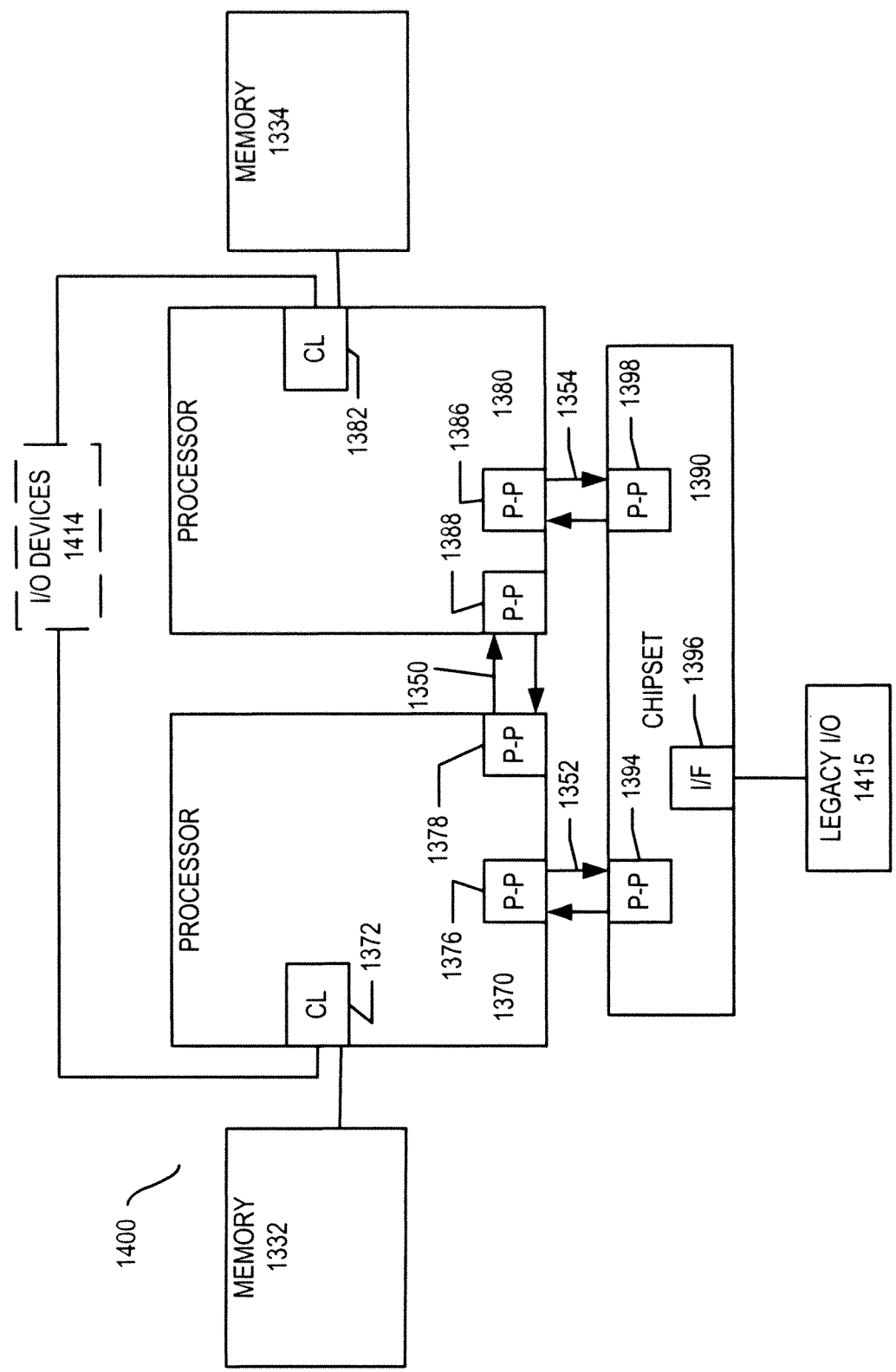
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
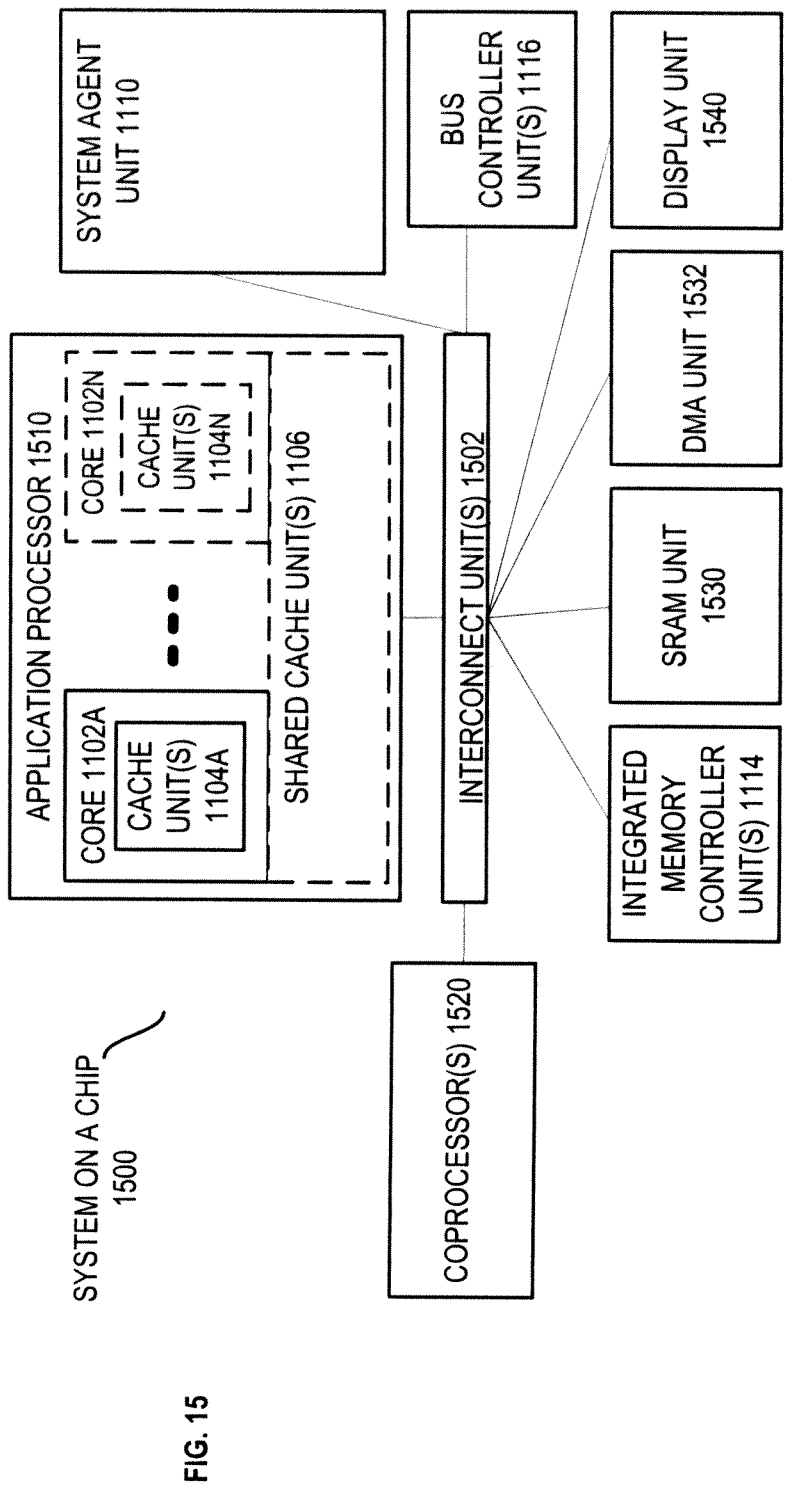
FIG. 15 is a block diagram of an embodiment of a system-on-a-chip architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 6-8 may also optionally be used in any of FIGS. 1-5. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been shown and described, where appropriate they may instead optionally be integrated together as a single component. In other cases, where a single component has been shown and described, where appropriate it may optionally be separated into two or more components.

Various operations and methods have been described. Some of the methods have been described in a relatively basic form in the flow diagrams, but operations may optionally be added to and/or removed from the methods. In addition, while the flow diagrams show a particular order of operations according to embodiments, that order is exemplary. Alternate embodiments may perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, a sequence of instructions, that if and/or when executed by a machine are operable to cause the machine to perform and/or result in the machine performing one or operations, methods, or techniques disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, computing devices or other electronic devices that include one or more processors. Examples of such computing devices and electronic devices include, but are not limited to, cellular phones, smartphones, tablet computers, netbooks, Mobile Internet devices (MIDs), media players, laptop computers, notebook computers, desktop computers, smart televisions, nettops, set-top boxes, and video game controllers, to name just a few examples.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 includes an inter-architecture compatibility apparatus including a control flow transfer reception module to receive a first call procedure operation, intended for a first architecture library module, from a first architecture code module. The first call procedure operation to involve a first plurality of input parameters. An application binary interface (ABI) change module is coupled with the control flow transfer reception module. The ABI change module is to make ABI changes to convert the first call procedure operation, that is to involve the first plurality of input parameters, to a corresponding second call procedure operation, that is to involve a second plurality of input parameters. The second call procedure operation is to be compatible with a second architecture library module. A control flow transfer output module is coupled with the ABI change module. The control flow transfer output module is to provide the second call procedure operation to the second architecture library module.

Example 2 includes the apparatus of Example 1, in which the ABI change module is to receive a first parameter of the first plurality of input parameters from a stack, and store a second parameter of the second plurality of input parameters, which is to correspond to the first parameter, in a register that is to be expected to be used for the second parameter by the second architecture library module.

Example 3 includes the apparatus of Example 1, in which the control flow transfer reception module, the ABI change module, and the control flow transfer output module are part of a first wrapper module that corresponds to the first architecture library module.

Example 4 includes the apparatus of Example 3, further including a plurality of wrapper modules that each correspond to a different first architecture library module, in which each of the plurality of wrapper modules has a control flow transfer reception module, an ABI change module, and a control flow transfer output module.

Example 5 includes the apparatus of Example 4, in which the first wrapper module has a same name as the first architecture library module, and in which each of the plurality of wrapper modules has a same name as the corresponding different first architecture library module.

Example 6 includes the apparatus of Example 1, further including a processor mode change module to determine a type of code selected from a first architecture code and a second architecture code that is to be executed, the processor mode change module to change a code type execution mode of a processor to be compatible with the determined type of code to be executed.

Example 7 includes the apparatus of Example 6, in which the processor mode change module is to determine the type of code to be executed based on inter-segment control flow transfers between a first segment that is to have all first architecture code and a second segment that is to have all second architecture code.

Example 8 includes the apparatus of any one of Examples 1 to 7, in which the control flow transfer reception module is to receive the first call procedure operation intended for a 32-bit library module from a 32-bit code module, in which the ABI change module is to convert the first call procedure operation to the corresponding second call procedure operation that is to be compatible with a 64-bit library module, and in which the control flow transfer output module is to provide the second call procedure operation to the 64-bit library module.

Example 9 includes the apparatus of any one of Examples 1 to 7, in which a maximum bit width of architectural integer registers capable of being used by the first architecture code module is different than a maximum bit width of architectural integer registers capable of being used by the second architecture code module.

Example 10 is an inter-architecture compatibility method including receiving a first call procedure operation, intended for a first architecture library module, from a first architecture code module. The first call procedure operation involves a first plurality of input parameters. The method also includes providing a corresponding second call procedure operation, involving a second plurality of input parameters, to a second architecture library module.

Example 11 includes the method of Example 10, in which receiving includes receiving the first call procedure operation intended for a 32-bit library module from a 32-bit code module, and in which providing includes providing the second call procedure operation to a 64-bit library module.

Example 12 includes the method of Example 10, further including receiving a first parameter of the first plurality of input parameters from a stack, and storing a second parameter of the second plurality of input parameters, the second parameter corresponding to the first parameter, in a register that the second architecture library module used to receive the second parameter.

Example 13 includes the method of Example 10, in which receiving includes receiving the first call procedure operation with a wrapper module having a same name as the first architecture library module.

Example 14 includes the method of Example 13, further including configuring the wrapper module to be searched for by a dynamic linker before both the first architecture library module and the second architecture library module.

Example 15 includes the method of Example 10, performed in an electronic device that does not have the first architecture library module.

Example 16 is a computer system including a memory to store a 32-bit code module and a 64-bit library module. A 64-bit processor is coupled with the memory. The system also includes an inter-architecture compatibility module to intercept a call procedure operation from the 32-bit code module for a 32-bit library module, and to provide a corresponding call procedure operation to the 64-bit library module.

Example 17 includes the computer system of Example 16, in which the inter-architecture compatibility module is to make application binary interface (ABI) changes to convert the call procedure operation for the 32-bit library module to the corresponding call procedure operation for the 64-bit library module.

Example 18 includes the computer system of Example 16, in which the 32-bit code module and the 64-bit library module are to be stored in different segments in the memory, and in which a segment that is to store the 32-bit code module is to use flat addressing.

Example 19 includes the computer system of Example 16, in which the inter-architecture compatibility module includes a wrapper module with a same name as the 32-bit library module which is to intercept the call procedure operation from the 32-bit code module.

Example 20 includes the computer system of any one of Examples 16 to 19, in which the computer system does not have the 32-bit library module.

Example 21 includes the computer system of Example 20, in which the computer system does not have any 32-bit library modules.

Example 22 includes the computer system of any one of Examples 16 to 19, in which the computer system includes a smartphone.

Example 23 is an article of manufacture including a non-transitory machine-readable storage medium that stores instructions that, if executed by a machine, will cause the machine to perform operations including receiving a first call procedure operation intended for a first architecture library module from a first architecture code module, the first call procedure operation involving a first plurality of input parameters. The operations also include making application binary interface (ABI) changes to convert the first call procedure operation involving the first plurality of input parameters to a corresponding second call procedure operation involving a second plurality of input parameters. The operations also include providing the second call procedure operation to a second architecture library module.

Example 24 includes the article of manufacture of Example 23, in which the instructions if executed by the machine will cause the machine to perform operations including receiving the first call procedure operation intended for a 32-bit library module from a 32-bit code module, and providing the second call procedure operation to a 64-bit library module.

Example 25 includes the article of manufacture of any of Examples 23 to 24, further storing instructions that, if executed by the machine, will cause the machine to perform operations including receiving a first parameter of the first plurality of input parameters from a stack, and storing a second parameter of the second plurality of input parameters, the second parameter corresponding to the first parameter, in a register that the second architecture library module used to receive the second parameter.

Example 26 includes an apparatus that is operable to perform the method of any of Examples 10-15.

Example 27 includes an apparatus including means for performing the method of any of Examples 10-15.

Example 28 includes an apparatus including modules, units, means, or any combination thereof, to perform the method of one of Examples 10-15.

Example 29 includes an article of manufacture including an optionally non-transitory machine-readable medium that optionally stores or otherwise provides instructions that if and/or when executed by a processor, computer system, or other machine are operable to cause the computer system or other machine to perform the method of any of Examples 10-15.

Example 30 includes a computer system or other electronic device including a bus or other interconnect, a processor coupled with the interconnect, a flash memory coupled with the interconnect, and an optional antenna coupled with the interconnect, the computer system or other electronic device operable to perform the method of any of Examples 10-15.

Example 31 includes an apparatus that is operable to perform one or more operations or any method substantially as described herein.

Example 32 includes an inter-architecture compatibility module substantially as described herein.

What is claimed is:

1. An inter-architecture compatibility apparatus comprising:
   a control flow transfer reception module that is one or more of (a) included on a die of a Y-bit architecture processor and (b) stored in a memory to receive a first call procedure operation intended for a first X-bit architecture library module, which is to be compatible with an X-bit architecture processor, from a first X-bit architecture code module that is to be running on the Y-bit architecture processor, through function interpositioning where a wrapper library is to be searched before a first X-bit architecture library is searched, and where a first wrapper module has a same name as the first X-bit architecture library module is to be identified before the first X-bit architecture library module, the first call procedure operation to involve a first plurality of input parameters, wherein the first X-bit architecture library module is one of a C standard library module, a math library module, a glibc module, and a system library module;
   an application binary interface (ABI) change module that is one or more of (a) included on the die of the Y-bit architecture processor (b) stored in the memory, and coupled with the control flow transfer reception module, the ABI change module to make ABI changes to convert the first call procedure operation that is to involve the first plurality of input parameters to a corresponding second call procedure operation that is to involve a second plurality of input parameters and that is to be compatible with a second Y-bit architecture library module, which is to be compatible with the Y-bit architecture processor, wherein Y is greater than X; and
   a control flow transfer output module that is one or more of (a) included on the die of the Y-bit architecture processor and (b) stored in the memory coupled with the ABI change module, the control flow transfer output module to provide the second call procedure operation to the second Y-bit architecture library module, which is to be compatible with the Y-bit architecture processor on which the first X-bit architecture code module is to be running.

2. The apparatus of claim 1, wherein the ABI change module is to:
   receive a first parameter of the first plurality of input parameters from a stack; and
   store a second parameter of the second plurality of input parameters, which is to correspond to the first parameter, in a register that is to be expected to be used for the second parameter by the second Y-bit architecture library module.

3. The apparatus of claim 1, wherein the control flow transfer reception module, the ABI change module, and the control flow transfer output module are part of the first wrapper module that corresponds to the first X-bit architecture library module.

4. The apparatus of claim 3, further comprising a plurality of wrapper modules that each correspond to a different first X-bit architecture library module, wherein each of the plurality of wrapper modules has a control flow transfer reception module, an ABI change module, and a control flow transfer output module.

5. The apparatus of claim 4, wherein each of the plurality of wrapper modules has a same name as the corresponding different first X-bit architecture library module.

6. The apparatus of claim 1, further comprising a processor mode change module that is one or more of (a) included on the die of the Y-bit architecture processor and (b) stored in the memory to determine a type of code selected from a first X-bit architecture code and a second Y-bit architecture code that is to be executed, the processor mode change module to change a code type execution mode of the Y-bit architecture processor to be compatible with the determined type of code to be executed.

7. The apparatus of claim 6, wherein the processor mode change module is to determine the type of code to be executed based on inter-segment control flow transfers between a first segment that is to have all first X-bit architecture code and a second segment that is to have all second Y-bit architecture code.

8. The apparatus of claim 1, wherein the control flow transfer reception module is to receive the first call procedure operation intended for a 32-bit library module from a 32-bit code module, wherein the ABI change module is to convert the first call procedure operation to the corresponding second call procedure operation that is to be compatible with a 64-bit library module, and wherein the control flow transfer output module is to provide the second call procedure operation to the 64-bit library module.

9. The apparatus of claim 1, further comprising a maximum bit width of architectural integer registers capable of being used by the first X-bit architecture code module is different than a maximum bit width of architectural integer registers capable of being used by the second Y-bit architecture library module, and wherein the second architecture library module is selected from a math library module and a C standard library module.

10. An inter-architecture compatibility method that is executable by a processor comprising:
  receiving a first call procedure operation intended for a first X-bit architecture library module, which is compatible with an X-bit architecture processor, from a first X-bit architecture code module that is to be running on a Y-bit architecture processor, by using function inter-positioning where a wrapper library is searched before a first X-bit architecture library is searched, and where a first wrapper module having a same name as the first X-bit architecture library module is identified before the first X-bit architecture library module, the first call procedure operation involving a first plurality of input parameters, wherein the first X-bit architecture library module is one of a C standard library module, a math library module, a glibc module, and a system library module;
  making application binary interface (ABI) changes to convert the first call procedure operation involving the first plurality of input parameters to a corresponding second call procedure operation involving a second plurality of input parameters and that is compatible with a second Y-bit architecture library module, which is compatible with the Y-bit architecture processor, wherein Y is greater than X; and
  providing the second call procedure operation to the second Y-bit architecture library module, which is compatible with the Y-bit architecture processor on which the first X-bit architecture code module is running.

11. The method of claim 10, wherein receiving a first call procedure operation intended for a first X-bit architecture library module comprises receiving the first call procedure operation intended for a 32-bit library module from a 32-bit code module, and wherein providing comprises providing the second call procedure operation to a 64-bit library module.

12. The method of claim 10, further comprising:
  receiving a first parameter of the first plurality of input parameters from a stack; and
  storing a second parameter of the second plurality of input parameters, the second parameter corresponding to the first parameter, in a register that the second Y-bit architecture library module used to receive the second parameter.

13. The method of claim 10, further comprising configuring the first wrapper module to be searched by a dynamic linker before both the first X-bit architecture library module and the second Y-bit architecture library module to be searched.

14. A computer system comprising:
  a memory to store a 32-bit code module, a 64-bit library module, and a 64-bit operating system module;
  a 64-bit processor coupled with the memory; and
  an inter-architecture compatibility module that is one or more of (a) included on a die of the 64-bit processor and (b) stored in the memory to intercept through function inter-positioning a call procedure operation from the 32-bit code module which is to be run on the 64-bit processor for a 32-bit library module, which is to be one of a C standard library module, a math library module, a glibc module, and a system library module, wherein in the function inter-positioning a wrapper library is to be searched before a 32-bit library is searched, and a first wrapper module has a same name as the 32-bit library module is to be identified before the 32-bit library module, and the inter-architecture compatibility module to provide a corresponding call procedure operation to the 64-bit library module, which is to be compatible with and is to be run on the 64-bit processor;
  wherein the inter-architecture compatibility module is to make application binary interface (ABI) changes to convert the call procedure operation for the 32-bit library module to the corresponding call procedure operation for the 64-bit library module; and
  wherein the 32-bit code module and the 64-bit library module are to be stored in different segments in the memory, and wherein a segment that is to store the 32-bit code module is to use flat addressing.

15. The computer system of claim 14, wherein the computer system does not have the 32-bit library module.

16. The computer system of claim 15, wherein the computer system does not have any 32-bit library modules.

17. The computer system of claim 14, wherein the computer system comprises a smartphone.

18. An article of manufacture comprising a non-transitory machine-readable storage medium that stores instructions that, executed by a processor of a computer system, cause the processor to perform operations including to:
  receive through function inter-positioning a first call procedure operation intended for a first X-bit architecture library module, which is to be compatible with an X-bit architecture processor, from a first X-bit architecture code module that is to be running on a Y-bit architecture processor, wherein in the function inter-positioning a wrapper library is to be searched before a first X-bit architecture library is searched, and where a first wrapper module has a same name as the first X-bit architecture library module is to be identified before the first X-bit architecture library module, the first call procedure operation involving a first plurality of input parameters, wherein the first X-bit architecture library module is one of a C standard library module, a math library module, a glibc module, and a system library module;

make application binary interface (ABI) changes to convert the first call procedure operation involving the first plurality of input parameters to a corresponding second call procedure operation involving a second plurality of input parameters; and provide the second call procedure operation to a second Y-bit architecture library module, which is to be compatible with the Y-bit architecture processor on which the first X-bit architecture code module is to be running, wherein Y is greater than X.

19. The article of manufacture of claim 18, wherein the instructions executed by the processor of the computer system, cause the processor to perform operations including to:

receive the first call procedure operation intended for a 32-bit library module from a 32-bit code module that is to be running on the Y-bit architecture processor; and provide the second call procedure operation to a 64-bit library module.

20. The article of manufacture of claim 18, further storing instructions executed by the processor of the computer system, cause the processor to perform operations including to:

receive a first parameter of the first plurality of input parameters from a stack; and store a second parameter of the second plurality of input parameters, the second parameter corresponding to the first parameter, in a register that the second Y-bit architecture library module is to have used to receive the second parameter.

\* \* \* \* \*